United States Patent
Kiencke et al.

(10) Patent No.: US 12,278,764 B2
(45) Date of Patent: Apr. 15, 2025

(54) FACILITATING ACCESS TO WEB FLOWS UTILIZING NETWORK ACCESS TOKENS ACCORDING TO NETWORK CAPACITY

(71) Applicant: Adobe Inc., San Jose, CA (US)

(72) Inventors: Thomas Kiencke, Hamburg (DE); Arne Franken, Hamburg (DE)

(73) Assignee: Adobe Inc., San Jose, CA (US)

(*) Notice: Subject to any disclaimer, the term of this patent is extended or adjusted under 35 U.S.C. 154(b) by 763 days.

(21) Appl. No.: 17/518,870

(22) Filed: Nov. 4, 2021

(65) Prior Publication Data

US 2023/0139078 A1 May 4, 2023

(51) Int. Cl.
| | | |
|---|---|---|
| *H04L 12/26* | (2006.01) | |
| *H04L 9/40* | (2022.01) | |
| *H04L 43/0876* | (2022.01) | |
| *H04L 43/16* | (2022.01) | |
| *H04L 47/11* | (2022.01) | |
| *H04L 47/12* | (2022.01) | |
| *H04L 47/20* | (2022.01) | |

(52) U.S. Cl.
CPC .......... *H04L 47/12* (2013.01); *H04L 43/0876* (2013.01); *H04L 43/16* (2013.01); *H04L 47/11* (2013.01); *H04L 47/20* (2013.01); *H04L 63/0807* (2013.01)

(58) Field of Classification Search
None
See application file for complete search history.

(56) References Cited

U.S. PATENT DOCUMENTS

| | | | |
|---|---|---|---|
| 11,074,322 B1* | 7/2021 | R. .................. | G06F 21/105 |
| 2010/0293275 A1* | 11/2010 | Rezaiifar ............ | H04L 47/24 |
| | | | 709/225 |
| 2020/0205030 A1* | 6/2020 | Wang ................ | H04L 47/215 |
| 2020/0267552 A1* | 8/2020 | Lee .................. | H04W 12/068 |
| 2020/0323030 A1* | 10/2020 | Mehta ............... | H04W 84/18 |

\* cited by examiner

*Primary Examiner* — Zewdu A Beyen
(74) *Attorney, Agent, or Firm* — Keller Preece PLLC

(57) ABSTRACT

The present disclosure relates to systems, methods, and non-transitory computer readable media for flexibly and efficiently managing network traffic for a web flow utilizing network access tokens. For example, the disclosed systems facilitate smooth, uninterrupted navigation through various webpages of a web flow (e.g., from an entry point to an exit point) by assigning network access tokens to client devices according to network capacity of servers hosting the web flow. In some embodiments, the disclosed systems permit access to, and navigation within various webpages within, the web flow for the client devices with network access tokens while preventing other client devices from accessing the web flow.

20 Claims, 10 Drawing Sheets

FACILITATING ACCESS TO WEB FLOWS UTILIZING NETWORK ACCESS TOKENS ACCORDING TO NETWORK CAPACITY

BACKGROUND

Network servers often experience extreme fluctuations in network traffic from client devices. For example, network servers can receive sudden spikes in client device requests in response to new product releases, event ticket availability, the particular time of day, or other external factors. In many circumstances, network servers are overwhelmed by large numbers of incoming requests and cannot adequately process heavy network traffic, leading to slow response times, unresponsive websites, or even server crashes. Some existing network traffic systems attempt to accommodate heavy network traffic with conventional load balancers or application programming interface ("API") gateways that cap server requests at a hard threshold and deliver error messages (e.g., HTTP status 429 messages) when network traffic exceeds the threshold. Despite the advancements in existing approaches for accommodating large amounts of network traffic, conventional network traffic systems continue to experience a number of drawbacks or disadvantages, particularly with regard to flexibility and efficiency.

SUMMARY

One or more embodiments described herein provide benefits and solve one or more of the foregoing or other problems in the art with systems, methods, and non-transitory computer readable media that flexibly and efficiently manage network traffic utilizing a network gateway that manages network access tokens to intelligently permit access to web flows in accordance with server capacity. For example, the disclosed systems facilitate smooth, uninterrupted navigation through various webpages of a web flow (e.g., from an entry point to an exit point) by assigning network access tokens to client devices according to network capacity of servers hosting the web flow. In some embodiments, the disclosed systems permit access to the web flow by client devices with network access tokens while preventing other client devices from accessing the web flow. For instance, the disclosed systems determine a network capacity of servers hosting a web flow and assign a threshold number of network access tokens to client devices based on the network capacity, while also preventing client devices beyond the threshold number from receiving access tokens and/or accessing the web flow. Upon determining that a client device exits the web flow, in some cases, the disclosed systems issue an additional network access token to permit an additional client device to access the web flow. By utilizing network access tokens based on network capacity in this manner, the disclosed systems more flexibly and efficiently enable client devices to navigate through a web flow without over-taxing server resources.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
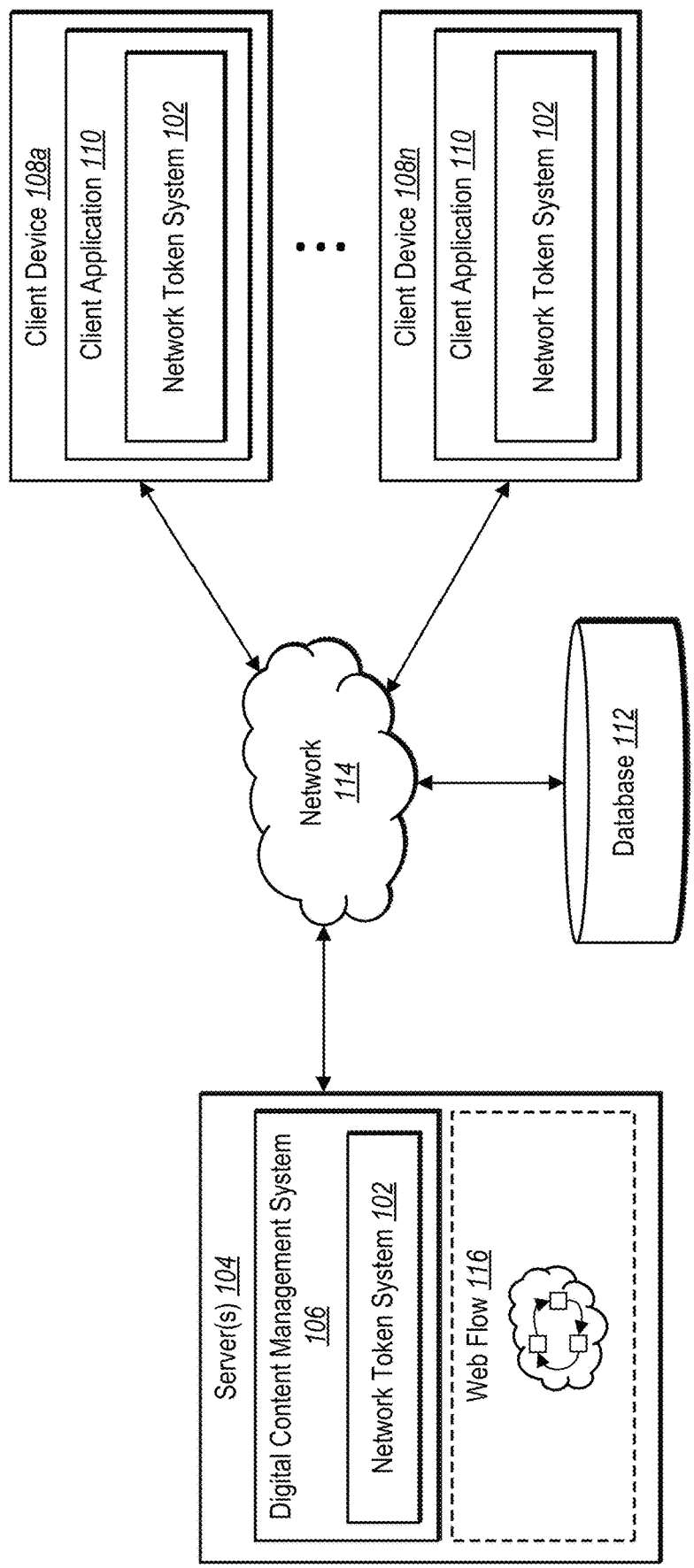
FIG. 1 illustrates an example system environment in which a network token system operates in accordance with one or more embodiments.

One or more embodiments described herein include a network token system that flexibly and efficiently manages network traffic utilizing network access tokens to permit access to web flows. In practical settings, network servers often deal with fluctuations in network traffic. At times, servers receive more requests than they can handle which, in conventional systems, leads to sluggish response times, excessive error messages, and/or network crashes. To prevent these or other issues, in some embodiments, the network token system issues network access tokens to client devices based on a network capacity of one or more servers hosting a web flow. For instance, the network token system determines a number of network access tokens to allot or allocate to client devices for accessing a web flow based on a network capacity of one or more servers hosting the web flow. Based on providing a network access token to a client device, in some cases, the network token system allows the client device to freely navigate among the webpages of the web flow. In certain embodiments, the network token system further withholds network access tokens from other client devices (e.g., beyond the available network capacity), preventing the other client devices from accessing the web flow (and bogging down the servers). In these or other embodiments, the network token system issues a network access token to a new client device upon detecting that a permitted client device exits the web flow (and releasing the network access token of the permitted client device).

As just mentioned, in one or more embodiments the network token system determines a network capacity of one or more servers hosting a web flow. For example, the network token system determines a threshold number of client devices that the one or more servers are capable of supporting within a web flow. In some cases, the network token system determines a number of network access tokens to allot or distribute to client devices based on (e.g., to match) the threshold number of client devices. Thus, in some embodiments, the network token system prevents overtaxing the servers hosting the web flow by ensuring that the number of client devices within the web flow (at the same time) is at or below the threshold number of the server capabilities.

In some embodiments, the network token system further receives requests from client devices to access a web flow. For example, the network token system receives a request from a client device to access a web flow to, for instance, purchase a product or reserve a ticket. Based on determining that at least one network access token is available (e.g., by determining that the servers hosting the web flow have remaining capacity to process the request), the network token system provides a network access token to the client device. Additionally, in certain embodiments, the network token system permits the client device to access the web flow by providing the network access token to, or associating the network access token with, the client device.

Upon providing the network access token to the client device, in some embodiments, the network token system enables the client device to navigate among webpages within the web flow. For example, the network token system receives additional requests from the client device to navigate from one webpage to another within the web flow. In response to receiving an additional request to access an additional webpage of the web flow, the network token system verifies that the client device (or the additional request) possesses a network access token for the web flow and thereby permits access to the webpage. In some cases, the network token system allows the client device to access information from outside of the web flow so long as the client device possesses a network access token and does not exit the web flow.

As mentioned, in one or more embodiments, the network token system allows for smooth navigation within the web flow for permitted client devices (e.g., client devices possessing network access tokens) by prioritizing the permitted client devices and preventing additional client devices from accessing the web flow. For instance, the network token system withholds a network access token from an additional client device requesting access to the web flow, where the additional client device exceeds a threshold number of the network capacity (or where there are no available network access tokens). Thus, in some embodiments, the network token system prevents client devices without network access tokens from accessing the web flow to thereby prevent sluggish server performance for client devices already in the web flow and/or to prevent network crashes that might otherwise result from heavy traffic. In some cases, the network token system further provides a notification to a prevented client device that the web flow is unavailable or full (and/or to wait for a network access token to become available).

In one or more embodiments, the network token system determines that a permitted client device (e.g., a client device associated with a network access token) exits a web flow. For example, the network token system detects an exit based on a client device navigating from a first webpage within a web flow to a second webpage outside of the web flow. In some cases, the network token system detects an exit by determining that a client device navigates to a particular exit point associated with the web flow (e.g., by selecting a particular link). The network token system can also detect an exit by determining that a client device is idle within a web flow for a threshold period of time (e.g., the network access token of the client device expires).

In response to detecting an exit of a client device from a web flow, in certain embodiments, the network token system permits an additional client device to access the web flow. For instance, the network token system issues an additional network access token to a second client device in response to detecting an exit from a first client device. In some cases, the network token system releases the network access token associated with the first client device to then issue an additional network access token, thereby maintaining a consistent number of network access tokens for the web flow according to the network capacity of the servers hosting the web flow.

As mentioned, conventional network traffic systems exhibit a number of drawbacks, particularly in flexibility and efficiency. To elaborate, many conventional network traffic systems inflexibly manage network traffic. For example, existing network traffic systems often attempt to avoid getting bogged down from heavy request volume by utilizing conventional load balancers and/or application programming interface ("API") gateways. Unfortunately, these conventional load balancers and API gateways rigidly process traffic in a uniform fashion across all client devices requesting access to a web flow. Consequently, existing systems that implement these techniques frequently experience bottlenecks where a host server becomes inundated with a high volume of requests, and the server crashes and/or distributes error messages to all (or nearly all) requesting client devices. Even for client devices that are initially able to access a web flow, each webpage within the web flow of a conventional system is compromised by the heavy network traffic, and receiving an error is possible at any time (e.g., repeatedly at each webpage). In some instances, a disruption at a webpage within the web flow requires the client device to start over and re-request entry to the web flow (thereby losing any previously entered information).

Due at least in part to their inflexibility, some conventional network traffic systems are also inefficient. For instance, some conventional systems inefficiently utilize computing and network resources such as processing power and network bandwidth. As a result of their inability to flexibly move client devices through web flows, existing systems often process network traffic inefficiently. Indeed, in some cases, conventional systems stagnate network traffic in situations where large of numbers of client devices request access to a web flow. For instance, some conventional systems receive large numbers of requests to access a web flow and try to push each requesting device through the web flow until the number of requests exceeds a threshold and a load balancer or API gateway issues error messages to all (or nearly all) requesting devices. As another product of their rudimentary request processing, existing systems sometimes generate and distribute excessive numbers of error messages and excessive numbers of repeat requests to access the web flow that could otherwise be avoided (e.g., as devices repeatedly try to gain entry in response to the errors).

As suggested above, embodiments of the network token system can provide several improvements or advantages over conventional network traffic systems. For example, embodiments of the network token system can provide improved flexibility over conventional systems. Compared to conventional systems that are rigidly fixed to issuing error messages uniformly (e.g., across all or nearly all requesting devices) once network traffic exceeds server limits (sometimes grinding network traffic to a halt), some embodiments of the network token system utilize network access tokens to more intelligently move client devices through a web flow. For example, the network token system issues a certain number of network access tokens based on a network capacity of servers hosting a web flow and facilitates navigation of client devices with network access tokens through webpages of a web flow from an entry point to an exit point before then permitting additional client devices to enter the web flow. By thus maintaining the number of client devices within a web flow at or below a capacity threshold, the network token system flexibly adjusts to fluctuating network traffic and prevents server overload with intelligent determination and distribution of network access tokens.

As a result of its improved flexibility, embodiments of the network token system further improve efficiency over conventional network traffic systems. While many conventional systems become inundated with requests and stifle network traffic as a result, embodiments of the network token system constantly push client devices (e.g., at a maximum capacity/rate) through a web flow by issuing and releasing network access tokens. For instance, the network token system issues a threshold number of network access tokens based on network capacity and prevents additional client devices from accessing a web flow. Thus, the network token system more efficiently utilizes computing resources such as processing power and network bandwidth by limiting network traffic through the web flow to only those client devices with network access tokens, avoiding bottlenecks and preventing excessive error messages and excessive repeated requests. In many situations, the network token system further improves throughput over conventional systems as well, utilizing network bandwidth more efficiently by allowing more client devices to access a web flow as previous client devices smoothly and seamlessly navigate through (uninterrupted by errors) to an exit point and their network access tokens are released.

Additional detail regarding the network token system will now be provided with reference to the figures. For example, FIG. 1 illustrates a schematic diagram of an example system environment for implementing a network token system 102 in accordance with one or more embodiments. An overview of the network token system 102 is described in relation to FIG. 1. Thereafter, a more detailed description of the components and processes of the network token system 102 is provided in relation to the subsequent figures.

As shown, the environment includes server(s) 104, client devices 108a-108n, a database 112, and a network 114. Each of the components of the environment communicate via the network 114, and the network 114 is any suitable network over which computing devices communicate. Example networks are discussed in more detail below in relation to FIG. 9.

As mentioned, the environment includes client devices 108a-108n. The client devices 108a-108n are one of a variety of computing devices, including a smartphone, a tablet, a smart television, a desktop computer, a laptop computer, a virtual reality device, an augmented reality device, or another computing device as described in relation to FIG. 9. Each of the client devices 108a-108n can be associated with a different user. The client devices 108a-108n communicate with the server(s) 104 via the network 114. For example, the client devices 108a-108n receive user input from users interacting with the client devices 108a-108n (e.g., via the client application 110) to, for instance, request access to a web flow for purchasing tickets to an event, reserving a product, or signing up for a software-as-a-service account. In some cases, the client devices 108a-108n receive user input via the client application 110 to indicate a particular web flow to access, such as a web flow including a series of interconnected websites for entering payment information and proceeding to checkout. Thus, the network token system 102 on the server(s) 104 receives information or instructions to determine availability of network access tokens for the client devices 108a-108n to access a web flow.

As shown, the client devices 108a-108n include a client application 110. In particular, the client application 110 is a web application, a native application installed on the client devices 108a-108n (e.g., a mobile application, a desktop application, etc.), or a cloud-based application where all or part of the functionality is performed by the server(s) 104. The client application 110 presents or displays information to a user, including a graphical user interface for a webpage within a web flow (e.g., the web flow 116). In some cases, a user interacts with the client application 110 to provide user input to perform operations as mentioned above, such as accessing or navigating among webpages of a web flow (e.g., the web flow 116).

As illustrated in FIG. 1, the environment includes the server(s) 104. The server(s) 104 generates, tracks, stores, processes, receives, and/or transmits electronic data, such as client device requests, network access tokens, notifications, and information for displaying webpages of a web flow. For example, the server(s) 104 receives data from the client device 108a in the form of a request to access a web flow. In addition, the server(s) 104 determines that a network access token is available and transmits data to the client device 108a to provide a network access token and present a webpage associated with the web flow. In some cases, the server(s) 104 receives data from the client device 108n in the form of a request to access the web flow, and in response to determining that no available network access tokens remain, provides a notification to the client device 108n that access to the web flow is denied. Indeed, the server(s) 104 communicates with the client devices 108a-108n to transmit and/or receive data via the network 114. In some embodiments, the server(s) 104 comprises a distributed server where the server(s) 104 includes a number of server devices distributed across the network 114 and located in different physical locations. The server(s) 104 comprises a digital image server, a content server, an application server, a communication server, a web-hosting server, a multidimensional server, or a machine learning server.

As further shown in FIG. 1, the server(s) 104 also includes the network token system 102 as part of a digital content management system 106. The digital content management system 106 communicates with the client devices 108a-108n to perform various functions associated with the client application 110 such as storing and managing network access tokens, providing webpages of the web flow 116 for display, and preventing access to the web flow 116 from others of the client devices 108a-108n. For example, the network token system 102 communicates with the database 112 to access network access tokens and/or information displayable as part of the web flow 116. Indeed, as further shown in FIG. 1, the environment includes a database 112. In particular, the database 112 stores information such as product information, webpages, network access tokens, and notifications.

In one or more embodiments, the server(s) 104 includes all, or a portion of, the network token system 102. For example, the network token system 102 operates on the server(s) 104 to issue and withhold network access tokens for the client device 108a-108n. In some cases, the network token system 102 utilizes, locally on the server(s) 104 or from another network location (e.g., the database 112), one or more network access tokens generated and stored based on a network capacity associated with the web flow 116. In certain implementations, the network token system 102 on the server(s) 104 determines a network capacity associated with the server(s) 104 (or another server hosting the web flow 116). For example, a network capacity represents or indicates a number of network nodes (e.g., client devices, servers, and/or other connected devices) that a server can support. In some cases, a network capacity indicates an amount of network traffic or information (e.g., a number of requests) that one or more servers can process (e.g., simultaneously).

In some embodiments, the server(s) 104 includes or hosts the web flow 116. As shown, the web flow 116 includes a plurality of webpages linked together. For example, a web flow can include one or more interconnected webpages. Indeed, a web flow can include a series of interconnected webpages navigable from one to another to accomplish a particular task such as purchasing or registering for a product or service, signing up for an account, entering personal information, or accessing particular content. For instance, a web flow can include an entry point (e.g., a selectable link or option on a webpage) for navigating into the web flow and an exit point (e.g., a selectable link or option on the same webpage or a different webpage) for navigating out of the web flow. In some cases, a web flow can have multiple entry points and multiple exit points. Example entry points include an add to cart option, a reserve ticket option, a register for an account option, or simply a link to a particular website (or group of webpages). Example exit points include a complete purchase option, a complete registration option, a cancel option, or a close window option.

In certain cases, the client devices 108a-108n includes all or part of the network token system 102. For example, the client devices 108a-108n can generate, obtain (e.g., download), or utilize one or more aspects of the network token system 102, such as a network access token from the server(s) 104. Indeed, in some implementations, as illustrated in FIG. 1, the network token system 102 is located in whole or in part on the client devices 108a-108n. For example, the network token system 102 includes a web hosting application that allows the client devices 108a-108n to interact with the server(s) 104. To illustrate, in one or more implementations, the client devices 108a-108n accesses a webpage supported and/or hosted by the server(s) 104.

Although FIG. 1 illustrates a particular arrangement of the environment, in some embodiments, the environment has a different arrangement of components and/or may have a different number or set of components altogether. For instance, in some embodiments, the network token system 102 is implemented by (e.g., located entirely or in part on) the client devices 108a-108n and/or a third-party device. In addition, in one or more embodiments, the client devices 108a-108n communicates directly with the network token system 102, bypassing the network 114. In some cases, the web flow 116 is located on, or hosted by, a different server apart from the server(s) 104 hosting the network token system 102. Further, in some embodiments, the database 112 is located external to the server(s) 104 (e.g., in communication via the network 114) or located on the server(s) 104 and/or on the client devices 108a-108n.

As mentioned, in one or more embodiments, the network token system 102 facilitates access to a web flow based on utilizing network access tokens. A network access token can refer to a digital token or identifier that grants or permits a client device to access and navigate within a web flow. For example, a network access token includes a series of letters and/or numbers and/or includes a specialized piece of code that, when affiliated with a client device (e.g., a unique identifier associated with a client device), designates that client device as permitted to access a web flow. In some embodiments, a network access token is stored in a database (e.g., a database 112) and associated with a client device. In other embodiments, a network access token is provided to a client device and validated in response to requests received from the client device. In still other embodiments, a network access token is included as part of a digital communication such as a request to access a webpage within a web flow. In some cases, a network access token is unique to a particular web flow and is reusable for different client devices to access the web flow. In other cases, a network access token is unique to a web flow and to a client device and is available on a one-time-use basis, expiring or invalidating after a client device associated with the network access token exits the corresponding web flow. Accordingly, the network token system 102 can determine that a client device possesses a network access token by determining an association between the client device and the token (e.g., via a database) and/or by receiving the network access token from the client device. In one or more embodiments, a network access token has a particular format, such as a javascript object notation web token ("JSON web token" or "JWT").

Figure 2:
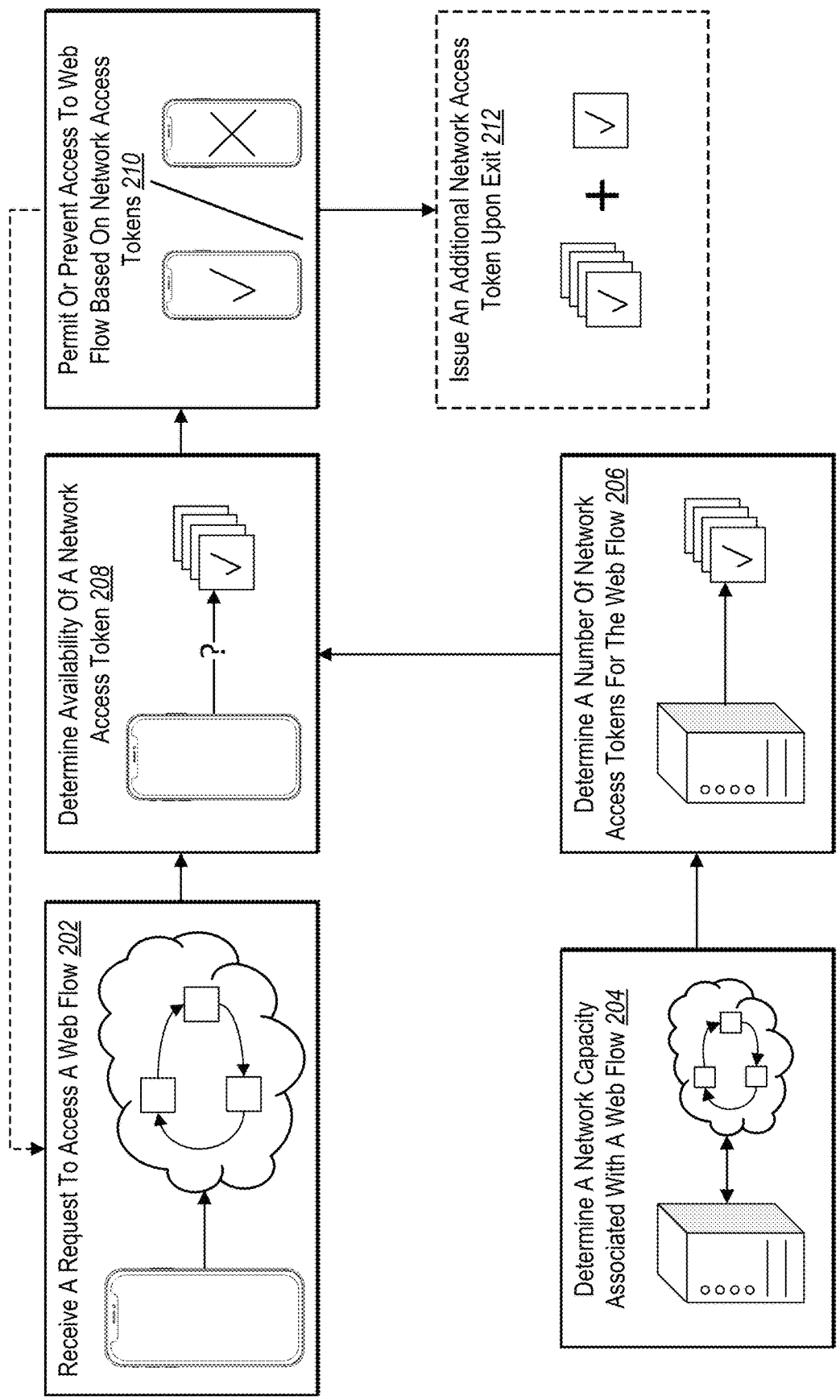
FIG. 2 illustrates an overview of managing network traffic for a web flow utilizing network access tokens in accordance with one or more embodiments.

In some embodiments, the network token system 102 facilitates access to, and navigation within, a web flow by issuing and verifying network access tokens. In particular, the network token system 102 issues a particular number of network access tokens to client devices according to a network capacity of one or more servers hosting a web flow. FIG. 2 illustrates an example overview for facilitating access to a web flow utilizing network access tokens in accordance with one or more embodiments. Additional detail regarding the various acts of FIG. 2 is provided thereafter with reference to subsequent figures.

As illustrated in FIG. 2, the network token system 102 performs an act 202 to receive a request to access a web flow. In particular, the network token system 102 receives a request from a client device (e.g., the client device 108a) to access a web flow. In some cases, the network token system 102 receives a request in the form of a user interaction selecting a particular option or link to enter a web flow via a particular entry point. For instance, the network token system 102 receives a user interaction selecting a purchase option or an add to cart option to access a web flow for entering personal information and proceeding through one or more webpages to checkout.

As further illustrated in FIG. 2, the network token system 102 performs an act 204 to determine a network capacity associated with the web flow. More specifically, the network token system 102 determines a network capacity by determining a number of network nodes (or bandwidth) that the servers hosting the web flow can handle. For example, the network token system 102 determines a number of client devices, web flow servers, external servers (e.g., associated with external websites), or other interconnected devices that can (simultaneously) communicate without causing slowdowns or other performance issues. Within on the number of network nodes, the network token system 102 further determines a number of client devices a server can support by, for example, determining a total number of supported network nodes and subtracting a number of non-client-device nodes (e.g., server nodes, routers, switches, or other connected devices) from the total.

In some embodiments, the network token system 102 determines a network capacity by testing the bandwidth and/or processing capabilities of the web flow servers. For example, the network token system 102 determines a number of requests and/or other client device interactions that the web flow servers can process (e.g., at a given time). In the same or other embodiments, the network token system 102 determines the network capacity by querying the web flow servers for network capacity information. In some cases, the network capacity indicates a maximum number of client devices that the web flow servers can handle for accessing and navigating within a web flow.

Additionally, the network token system 102 performs an act 206 to determine a number of network access tokens for the web flow. In particular, the network token system 102 determines a number of network access tokens to match a network capacity of the web flow servers. For instance, the network token system 102 determines a number of network access tokens to generate and/or distribute to client devices based on a number of client devices that the web flow servers can accommodate for accessing and navigating within the web flow. In one or more embodiments, the network token system 102 thus generates and stores network access tokens available for distribution to client devices upon receiving requests to access the web flow. In some cases, the network capacity of a web flow changes over time as servers are updated, changed, added, removed, or otherwise changed. Thus, the network token system 102 redetermines the network capacity (e.g., via the act 204) and updates the number of network access tokens associated with the web flow based on the network capacity. In some cases, the network token system 102 updates the number of available network access tokens on a periodic basis (e.g., daily, weekly, or monthly) or in real time based on detecting a change in network capacity.

As further illustrated in FIG. 2, the network token system 102 performs an act 208 to determine availability of a network access token. To elaborate, the network token system 102 performs the act 208 in response to the act 202 whereby the network token system 102 receives a request to access a web flow. Thus, the network token system 102 determines whether a network access token is available for a client device requesting access to the web flow. Indeed, the network token system 102 determines whether the web flow servers can accommodate the requesting client device based on the availability of a network access token (which is based on the network capacity of the web flow servers).

Based on the availability of a network access token, the network token system 102 further performs an act 210 to permit or prevent access to the web flow based on the network access tokens. More specifically, the network token system 102 permits the requesting client device to access the web flow in response to determining that a network access token is available for the client device (e.g., that the web flow servers can accommodate the client device). Conversely, the network token system 102 prevents access to the web flow in response to determining that no network access token is available (e.g., that the web flow servers cannot accommodate the client device).

In some embodiments, the network token system 102 permits access to a threshold number of client devices up to the number of available network access tokens. In addition, the network token system 102 prevents additional client devices beyond the threshold number (or beyond the number of available network access tokens) from access the web flow. Indeed, in one or more embodiments, the network token system 102 repeats the act 202 to receive an additional request for access to the web flow. More particularly, the network token system 102 receives a request to access the web flow from an additional client device. The network token system 102 thus repeats the acts 208 and 210 to determine an availability of a network access token and to permit or prevent access to the web flow based on the availability. Thus, the network token system 102 prevents the web flow servers from becoming overburdened and slowing down or sending error messages to client devices already within the web flow.

In some embodiments, the network token system 102 provides network access tokens on a first-come-first-serve basis, while in other embodiments, the network token system 102 determines or selects client devices as recipients for network access tokens based on other features or factors. To elaborate, the network token system 102 determines which client devices to prioritize in providing or distributing network access tokens. In some cases, the network token system 102 distributes network access tokens first to client devices associated with prioritized/paid accounts or premier member accounts of a particular system (e.g., a software-as-a-service system) before providing remaining network access tokens to other (e.g., non-paying or non-premier) client devices. In other cases, the network token system 102 prioritizes client devices participating in a product trial or product demonstration over other client devices (e.g., to ensure a smooth experience during the trial or demonstration). In still other cases, the network token system 102 prioritizes client devices in a particular geographic region over client devices outside of the region. The network token system 102 can prioritize based on a variety of additional factors, such as device type (e.g., personal computer or mobile device), operating system, device speed (e.g., faster devices with more processing speed access the web flow first), user information, or predicted time to navigate the web flow (e.g., use a machine learning model to predict time to completion for a client device).

To prioritize certain client devices over others in distributing network access tokens, in some embodiments, the network token system 102 analyzes historical client device interactions. To elaborate, the network token system 102 determines or accesses historical client device interactions associated with a client device, including previous internet protocol addresses, previously visited web flows (or other websites or webpages), previously used network access tokens, user accounts associated with client devices (e.g., accounts within particular software systems or other subscriber systems), or indications to participate in a trial or demonstration. From the historical client device interactions, the network token system 102 determines information such as a geographic region associated with a client device, whether the client device is associated with a paying or premier account of a certain system, whether the client device is participating in a trial or demonstration, predicted time to completion, and/or other client device information that differentiates one device from another in prioritizing distribution of network access tokens.

In one or more embodiments, the network token system 102 selects client devices by predicting, from historical client device interactions, which devices are more likely to access and/or complete a web flow (e.g., convert and/or complete a purchase through the web flow). For instance, the network token system 102 analyzes historical client device interactions to determine a likelihood or a probability that a client device will access and/or complete a web flow. In some cases, the network token system 102 utilizes a machine learning model such as a neural network (e.g., a deep neural network) to generate web flow access/completion predictions. For example, the network token system 102 extracts latent features from a set of historical client device interactions for a client device and generates a web flow access/completion prediction utilizing a web flow access neural network. Indeed, the web flow access neural network can include parameters such as weights and biases learned through training to generate predictions from historical client device interactions utilizing its various layers and neurons.

In certain implementations, the network token system 102 receives additional requests to navigate within the web flow. More specifically, the network token system 102 receives a request to navigate from one webpage within a web flow to another webpage within the same web flow (e.g., from a webpage for entering payment information to a webpage for reviewing the payment information and submitting payment). In response, the network token system 102 determines whether the client device submitting the request possesses a network access token (e.g., by determining that the client device submitting the request has been issued a network access token). Based on verifying that the client device possesses a network access token, the network token system 102 permits the client device to navigate to the webpage. In this fashion, the network token system 102 verifies each navigation request within the web flow to ensure that the client devices navigating in the web flow are permitted (with network access tokens) and that, therefore, the web flow servers can service the navigation requests smoothly without overloading.

As further illustrated in FIG. 2, in some embodiments, the network token system 102 performs an act 212 to issue an additional network access token (i.e., the same or a different network access token) upon detecting an exit from a web flow. In particular, the network token system 102 detects that a client device exits the web flow by navigating to an exit point associated with the web flow. For example, the network token system 102 receives a request from a client device to navigate from a first webpage within the web flow to a second webpage outside of the web flow (e.g., by selecting an option to complete a purchase or an option to cancel a purchase).

In some cases, the network token system 102 determines that a client device exits a web flow by determining that a network access token associated with the client device expires or times out. For instance, a network access token times out when a client device is idle (e.g., performing no interactions within the web flow) for a threshold period of time. In some cases, a network access token times out irrespective of user interaction (e.g., whether the client device is interacting within a web flow or not), thus limiting the duration of time that a client device can spend within a web flow before expiration of the network access token. Thus, the network token system 102 prevents further navigation within a web flow from a client device whose network access token has expired.

Based on detecting the exit of the client device from the web flow, the network token system 102 releases the network access token associated with the client device. For example, the network token system 102 invalidates or deletes the network access token and determines that a spot within the web flow is now available (e.g., because fewer than the limited number of network access tokens are currently issued and/or because the web flow servers have additional network capacity). Based on invalidating the network access token, the network token system 102 issues an additional network access token to permit an additional client device to access the web flow.

In certain embodiments, when the network token system 102 invalidates one network access token, the network token system 102 generates and stores another (and issues it when a client device requests) to maintain a number of network access tokens consistent with, and reflecting, the network capacity of the web flow servers. In some cases, the network token system 102 releases the network access token and reissues the network access token to an additional client device to access the web flow. Thus, the network token system 102 maintains a number of client devices within the web flow according to the number of network access tokens (which is based on the network capacity of the web flow servers).

Figure 3:
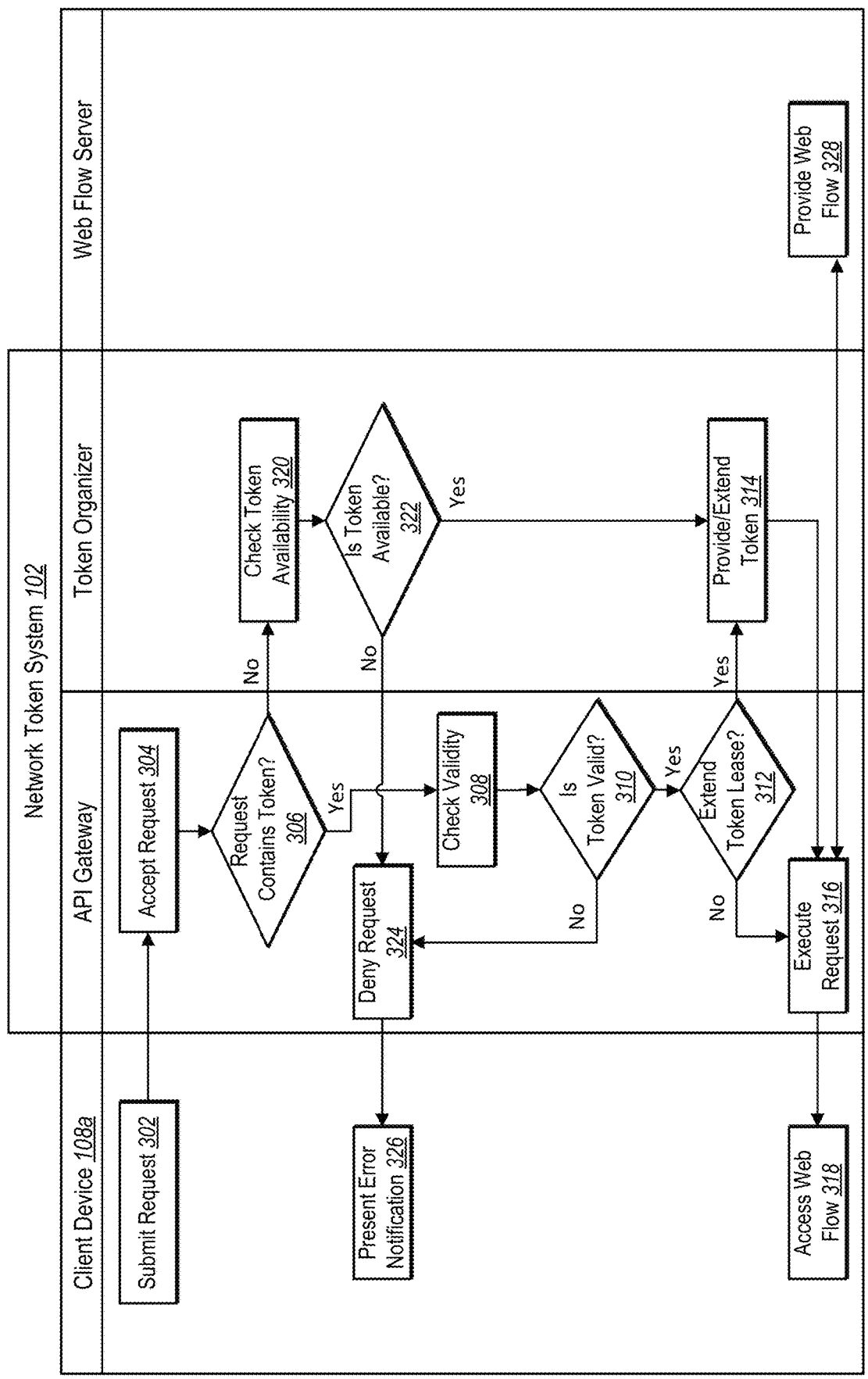
FIG. 3 illustrates a flow diagram regarding the network token system managing web flow traffic in accordance with one or more embodiments.

As mentioned, in certain described embodiments, the network token system 102 permits and prevents access to a web flow based on availability of network access tokens. In particular, the network token system 102 determines availability of network access tokens based on a network capacity of a web flow server hosting a web flow. FIG. 3 illustrates an example flow diagram of acts performed by various actors for determining whether to permit or prevent access to a web flow in accordance with one or more embodiments. While FIG. 3 illustrates a single client device 108a submitting a single request, the description of FIG. 3 extends to multiple client devices and multiple requests.

As illustrated in FIG. 3, the client device 108a performs an act 302 to submit a request. For example, the client device 108a submits a request to access a webpage within a web flow to, for instance, purchase tickets for a concert. In response, the API gateway of the network token system 102 performs an act 304 to accept or receive the request. Indeed, the API gateway receives the request from the client device 108a and determines that the client device 108a is requesting to access a webpage within a particular web flow.

As further illustrated in FIG. 3, the API gateway (as part of the network token system 102) performs an act 306 to determine whether the request contains a network access token. In particular, the API gateway determines whether the client device possesses a network access token corresponding to the requested web flow. In some cases, the API gateway determines whether the client device 108a is already associated with, or has already been issued, a network access token for accessing the particular web flow.

In response to determining that the request (or the client device 108a) includes or is associated with a network access token, the API gateway (as part of the network token system 102) performs an act 308 to check the validity of the network access token. More specifically, the API gateway checks the validity by determining whether the network access token has expired and/or whether the network access token corresponds to the requested web flow. Based on the validity check, the API gateway performs an act 310 to determine whether the network access token is valid.

In response to determining that the network access token is valid, the API gateway (as part of the network token system 102) performs an act 312 to determine whether to extend a token lease. More particularly, the API gateway compares a remaining lease duration of a network access token with a threshold lease duration and extends the lease if the remaining duration is less than the threshold. In some cases, the API gateway determines whether the network access token would expire before the client device 108a accesses the web flow (e.g., a requested webpage within the web flow). For instance, the API gateway determines if the network access token is expiring and therefore requires an extension of time for the client device 108a to access the web flow. In some cases, the API gateway determines that no lease extension is required (e.g., the time duration of the network access token is sufficient to access the web flow). In other cases, the API gateway determines that a lease extension is required for the network access token to remain valid (e.g., the time duration of the network access token is insufficient and needs to be extended).

In response to determining that no extension is required for the network access token, the API gateway (as part of the network token system 102) performs an act 316 to execute the request. In particular, the API gateway grants or permits the client device 108a to access the web flow hosted by the web flow server (show in the righthand column). For instance, the client device 108a performs an act 318 to access the web flow as provided by the web flow server. To access the web flow, the client device 108a accesses a webpage included within the web flow to, for example enter payment information. For the client device 108a to access the web flow, the web flow server performs an act 328 to provide the web flow. Specifically, the web flow server provides a requested webpage of the web flow for display on the client device 108a (e.g., whereby a user can enter payment information).

In response to determining that an extension is required (via the act 312), however, the token organizer (as part of the network token system 102) performs an act 314 to provide or extend the lease of the network access token. In particular, the token organizer extends the duration or time that the network access token is valid to enable the client device 108a to access the web flow. In turn, the API gateway (as part of the network token system 102) performs the act 316 to execute the request and permit the client device 108a to access the web flow. Indeed, the web flow server performs the act 328 to provide the web flow, and the client device 108a performs the act 318 to access the web flow (e.g., by displaying a webpage within the web flow).

Returning to the act 310, upon determining that the network access token is not valid, the API gateway (as part of the network token system 102) performs an act 324 to deny the request. More specifically, the API gateway prevents the client device 108a from accessing the web flow because the network access token is expired, not associated with the proper web flow (e.g., associated with a different web flow), or otherwise invalid. In some cases, as part of denying the request, the API gateway provides an error notification to the client device 108a indicating the denial. In turn, the client device 108a performs the act 326 to present or display the error notification.

Returning to the act 306, upon determining that the request from the client device 108a does not contain a network access token (or that the client device 108a has not been issued a network access token), the token organizer (as part of the network token system 102) performs an act 320 to check token availability. More specifically, the token organizer determines a number of network access tokens associated with the requested web flow and further determines a number of network access token issued to client devices requesting the web flow. In addition, the token organizer performs an act 322 to determine whether a network access token is available for the request from the client device 108a.

In response to determining that a network access token is available, the token organizer (as part of the network token system 102) performs an act 314 to provide or extend the network access token. Indeed, if available network access tokens remain, the token organizer provides a network access token to the client device 108a to permit the client device 108a to access the web flow. Additionally, the API gateway (as part of the network token system 102) performs the act 316 to execute the request and permit access to the web flow. For instance, the API gateway communicates with the web flow server to perform the act 328 to provide a requested webpage as part of the web flow for display on the client device 108a, whereupon the client device 108a performs the act 318 to access the web flow by displaying the webpage presented as part of the web flow.

In response to determining that a network access token is unavailable (via the act 322), however, the API gateway (as part of the network token system 102) performs the act 324 to deny the request. Indeed, as described, the API gateway denies the request by preventing the client device 108a from accessing the web flow and by instead generating and providing an error notification for display on the client device 108a. In turn, the client device 108a performs the act 326 to present the error notification indicating that access to the web flow has been denied. By performing the acts illustrated and described in relation to FIG. 3, the network token system 102 (and its constituent components such as the API gateway and the token organizer) maintains network traffic at or below an acceptable level for the web flow server, ensuring smooth operation for permitted client devices and increasing throughput for the web flow as client devices progress from entry to exit without navigational hang-ups or errors.

In one or more embodiments, the network token system 102 facilitates the client device 108a temporarily navigating outside of a web flow (or accessing information from a server outside of the web flow) without exiting the web flow. To elaborate, after issuing a network access token to the client device 108a and permitting access to a web flow, the API gateway (as part of network token system 102) receives a request from the client device 108a to access a webpage that is outside of the web flow. In response, the network token system 102 permits the client device 108a to access the external webpage for a limited period of time. For instance, the network token system 102 limits the time duration for accessing external webpages and invalidates a network access token if the time duration is exceeded (thereby preventing further access to return to the web flow).

In some cases, the API gateway (as part of the network token system 102) permits access to an external webpage or database based on whether a client device possesses a network access token. In some cases, the network token system 102 uses the network access token of the client device 108a and extends the network access token to apply to the server hosting the external webpage or database (to ensure that the external webpage or database is not overloaded or blocked). For example, if a webpage request requires a call to a database for additional information, the network token system can use the network access token to ensure that the database is also not overwhelmed. Indeed, the database can require the network access token before providing the requested information.

In other cases, the network token system 102 determines an availability of a network access token. If a network access token is available, the network token system 102 issues the network access token to a server hosting the external webpage to permit communications between the web flow server, the external server, and the client device 108a (e.g., as though they were all in the web flow). If a network access token is unavailable, the network token system 102 prevents access to the external webpage or provides a notification that navigating to the external webpage requires exiting the web flow.

In some implementations, the network token system 102 facilitates a web flow server to access information outside of a web flow by utilizing network access tokens. More specifically, the network token system 102 (e.g., the API gateway or the token organizer) receives a request from a web flow server to access an external server to present information not part of the web flow (e.g., third-party information from another server). In response to the request, the network token system 102 extends the network access token of the client device 108a to apply to the external server. In certain cases (e.g., instead of using the same network access token of the client device 108a), the network token system 102 determines availability of an additional network access token and issues the additional network access token to the external server to ensure the external server is not blocked from the web flow.

Figure 4A:
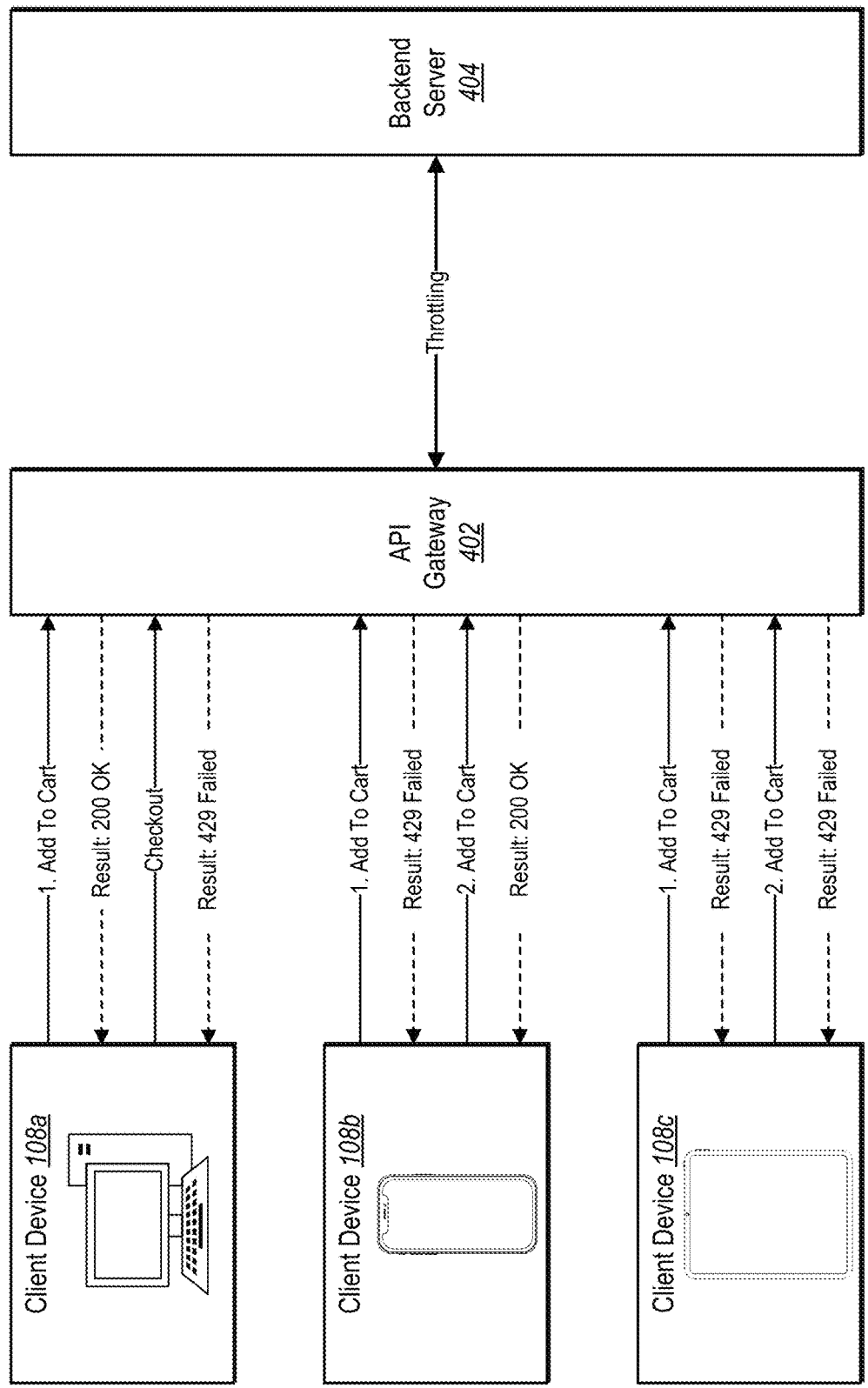
FIG. 4A illustrates an example conventional system for managing network traffic in accordance with one or more embodiments.
Figure 4B:
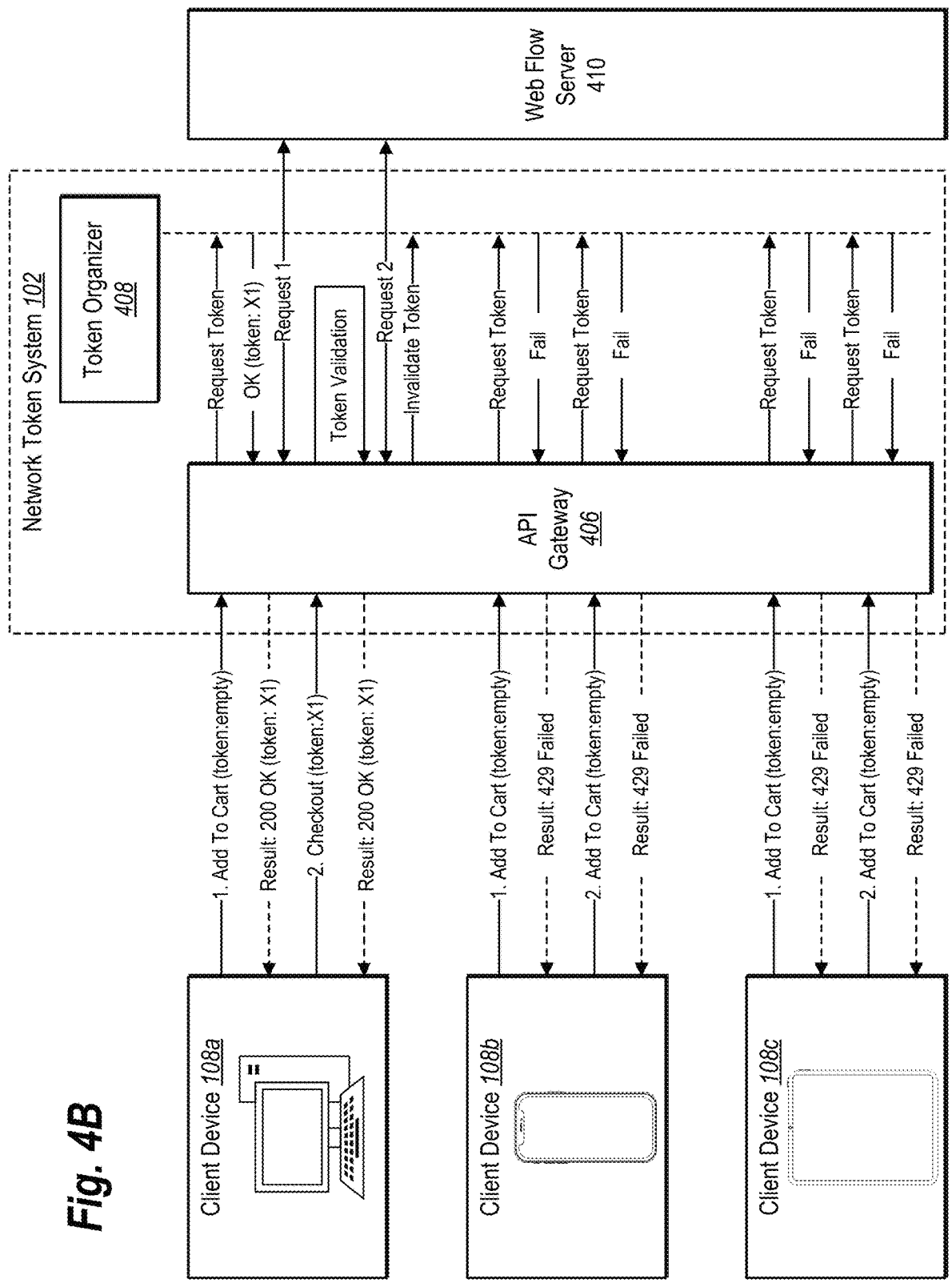
FIG. 4B illustrates an example of the network token system managing network traffic in accordance with one or more embodiments.

As mentioned above, in certain described embodiments, the network token system 102 provides advantages over conventional network traffic systems. In particular, the network token system 102 improves the processing of network traffic associated with a particular group of websites within a web flow, which further results in efficiency and throughput improvements compared to prior systems. FIGS. 4A-4B illustrate an example of the improvements in network traffic processing of the network token system 102 over conventional systems in accordance with one or more embodiments. Specifically, FIG. 4A illustrates a diagram of processing network traffic for a conventional network traffic system. Thereafter, FIG. 4B illustrates a diagram of processing network traffic for the network token system 102 described herein.

As illustrated in FIGS. 4A-4B, the "200 OK" notifications represent hypertext transfer protocol ("HTTP") status 200 messages that represent successful requests and providing requested data for display on a client device. Conversely, the "429 Failed" notifications represent hypertext transfer protocol status 429 messages that represent unsuccessful requests and a denial of providing requested data (and instead providing an error notification).

In the example illustrated in FIG. 4A, the conventional API gateway 402 of prior systems receives requests to access a web flow from multiple client devices, such as the client devices 108a, 108b, and 108c. For example, the API gateway receives requests in the form of user interactions selecting an add to cart option within a webpage (e.g., where the add to cart is an entry point for the web flow). In some cases, the API gateway 402 receives the requests simultaneously or in rapid succession, and the backend server 404 is incapable of processing all received requests as they are received.

As a result, the API gateway 402 throttles the network traffic between the requesting client devices 108a-108c and the backend server 404. In some cases, the API gateway allows only a certain number of requests (or a certain number of requests per second) for accessing a web page hosted by the backend server 404, which results in a traffic bottleneck and the issues illustrated in FIG. 4A. As shown, the API gateway 402 first receives an add to cart request from the client device 108a and permits the client device 108a to add to cart ("result: 200 OK"). The API gateway 402 further receives a checkout request from the client device 108a but responds with an error notification ("result: 429 failed") because of other intervening requests.

Indeed, as shown, the API gateway 402 receives a first add to cart request from the client device 108b but responds with an error notification because the API gateway 402 was still processing the add to cart request from the client device 108a (e.g., because of a throttling cap on received requests). The API gateway 402 further receives a second add to cart request from the client device 108b which is permitted because the previous request was processed. However, because the API gateway 402 received and permitted the second add to cart request, the API gateway 402 prevents the checkout request from the client device 108a received while the add to cart request is processed. Thus, even though the client device 108a already added to cart, the client device 108a nevertheless receives an error notification upon attempting checkout because of the heavy network traffic. Indeed, no client device illustrated in FIG. 4A completes a web flow through checkout, instead receiving error messages preventing progress to an exit point.

As further shown, the API gateway 402 receives two add to cart requests from the client device 108c, both of which are denied. For instance, the API gateway 402 receives the first add to cart request as the add to cart request from the client device 108a is being processed, resulting in a denial. In addition, the API gateway 402 receives the second add to cart request as the second add to cart request from the client device 108b is being processed, resulting in another denial. Indeed, as illustrated in FIG. 4A, the throttling techniques used with API gateways of conventional systems results in conflicting requests from client devices which: i) prevent access to a web flow, ii) result in errors for devices already accessing the web flow, and iii) greatly slow down throughput of the web flow.

By contrast, as illustrated in FIG. 4B, the network token system 102 provides a much smoother, more intelligent approach to managing network traffic utilizing network access tokens. As shown in the example of FIG. 4B, the network token system 102 limits the number of network access tokens to one, allowing only a single client device to access the web flow at a time (e.g., based on a network capacity of the web flow server 410). As illustrated, the API gateway 406 (as part of the network token system 102) receives an add to cart request from the client device 108a, whereupon the API gateway 406 requests a network access token from the token organizer 408 (as part of the network token system 102).

Upon determining that a network access token is available, the token organizer 408 provides the network access token ("X1") to the API gateway 406 to provide to the client device 108a and permit access to the web flow via "Request 1." In addition, the API gateway 406 receives a checkout request from the client device 108a (e.g., to navigate from an add to cart webpage to a checkout webpage of the web flow). As illustrated in FIG. 4, the API gateway 406 receives a network access token with each request from the client device 108a. Accordingly, the API gateway 406 receives the X1 network access token as part of the checkout request. In response, the API gateway 406 performs the token validation to determine whether the checkout request includes (or the client device 108a possesses) a network access token. Upon validating the network access token, the API gateway 406 permits access to the checkout webpage within the web flow via "Request 2." As also illustrated, the API gateway 406 invalidates the network access token upon detecting that the client device 108a exits the web flow by, for instance, completing or canceling the checkout process.

As further illustrated in FIG. 4B, the network token system 102 prevents the client device 108b and the client device 108c from accessing the web flow hosted by the web flow server 410. Specifically, the network token system 102 receives add to cart requests from the client devices 108b-108c before detecting an exit by the client device 108a. Thus, when the API gateway 406 requests network access tokens from the token organizer 408 in response to the requests, the token organizer 408 indicates that no available network access tokens remain. In response, the API gateway 406 provides error notifications to the client devices 108b-108c in response to each received request until detecting the exit from the client device 108a and releasing the corresponding network access token.

In some embodiments, the network token system 102 receives requests, validates network access tokens, and performs other functions using a particular layer within an open systems interconnection ("OSI"). For instance, by utilizing HTTP status codes, the network token system 102 operates on, and communicates within, OSI layer 7 (e.g., the "Application Layer") from among the seven layers of the OSI model. Specifically, OSI layer 7 is a human-computer interaction layer whereby applications can access network services. Thus, the network token system 102 operates on OSI layer 7 to facilitate communication between nodes in a semi-permanent fashion, where communication between nodes may be routed across tens or hundreds of physical nodes in different geographic locations. In certain embodiments, the network token system 102 operates on, and communicates within, OSI layer 5 (e.g., the "Session Layer") from among the seven layers of the OSI model. Specifically, OSI layer 5 is responsible for maintaining network connections and controlling ports and communication sessions between network nodes.

By utilizing the network access tokens as shown, the network token system 102 facilitates smooth, efficient navigation of the client device 108a through the web flow without interruption. Consequently, upon detecting that the client device 108a exits the web flow, the network token system 102 can further issue a network access token to another client device to progress through the web flow, and so on until all client devices are through-without excessive error messages at various points along the way.

In some cases, the servers of a web flow are regional. For example, the web flow server 410 illustrated in FIG. 4B can be a regional web flow server hosting a web flow for a particular geographic region. Additionally, in certain embodiments, the network capacity of a server (e.g., web flow server 410) changes over time. For instance, as servers hosting a web flow are added, removed, upgraded, updated, reconfigured, or otherwise changed over time, the network capacity associated with the web flow also changes. Thus, the network token system 102 (e.g., via the token organizer 408) determines and updates network capacity on a periodic basis and/or in response to detecting changes to the web flow server 410. Additionally, the network token system 102 (e.g., via the token organizer 408) updates a number of available network access tokens based on changes to network capacity, increasing or decreasing the number of network access tokens according to the capabilities of the web flow server 410.

Figure 5B:
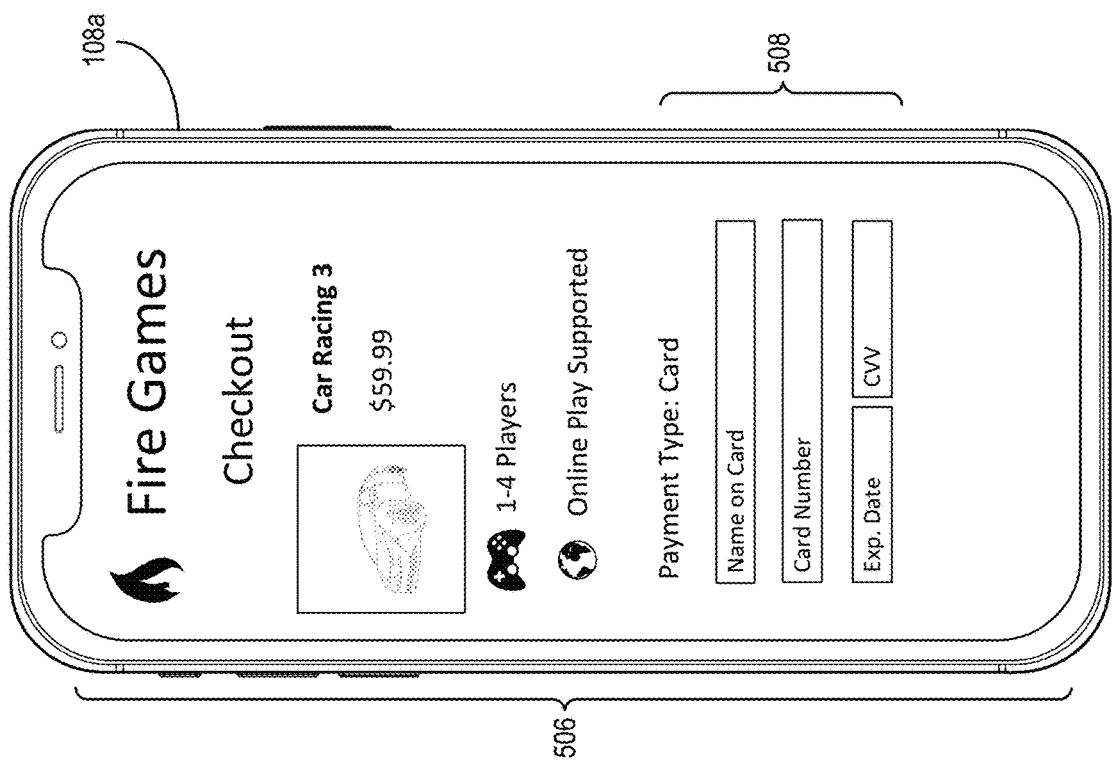
FIGS. 5A-5B illustrate an example sequence of webpage interfaces for permitting access to a web flow utilizing network access tokens in accordance with one or more embodiments.
Figure 5A:
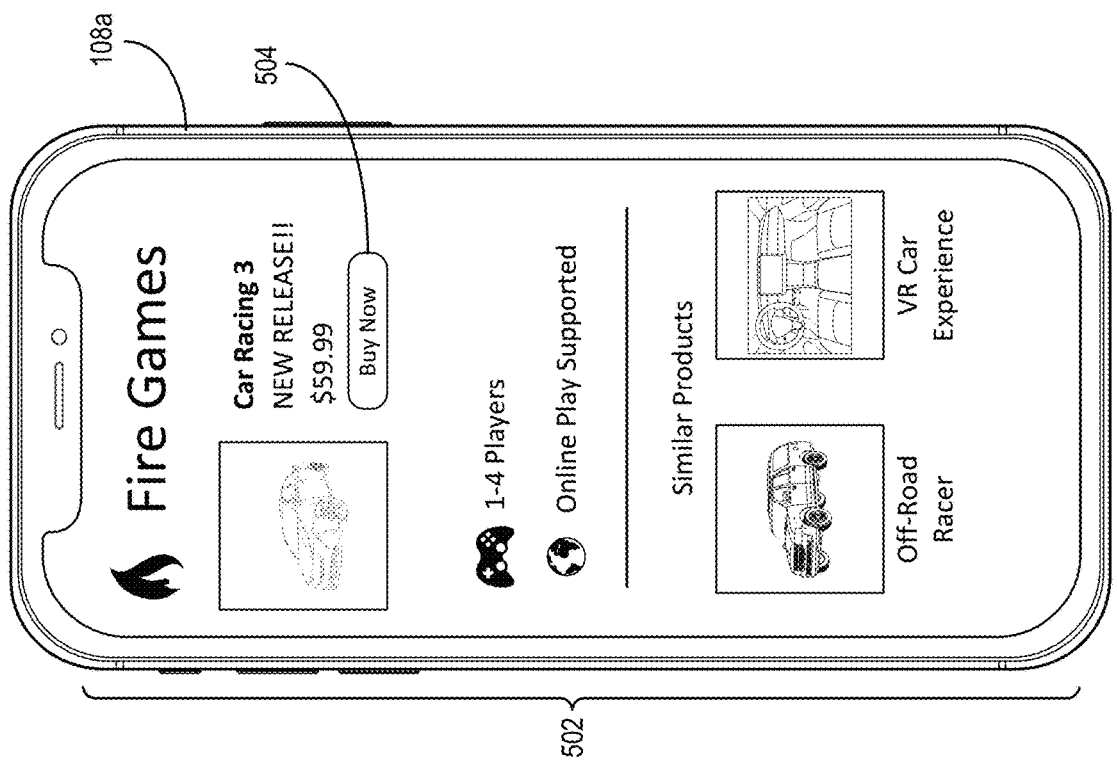

As mentioned above, in certain described embodiments, the network token system 102 provides a webpage of a web flow for display on a client device. In particular, the network token system 102 provides a webpage of a web flow for display in response to issuing and validating a network access token for a client device. FIGS. 5A-5B illustrate an example flow for transitioning from a webpage outside of a web flow to a webpage inside a web flow in accordance with one or more embodiments.

As illustrated in FIG. 5A, the client device 108a presents a webpage interface 502 that includes various graphical elements and selectable options. As shown, the webpage interface 502 is a mobile interface for a "Fire Games" product called "Car Racing 3." The webpage interface 502 includes information about the video game along with selectable options for similar products. In addition, the webpage interface 502 includes a purchase option 504 ("Buy Now") selectable to request entry to a web flow. Indeed, in some cases, the purchase option 504 is an entry point for a web flow of one or more interconnected webpages for purchasing the "Car Racing 3" video game.

Upon receiving a user interaction selecting the purchase option 504, client device 108a provides or submits a web flow access request. In turn, the network token system 102 receives the web flow access request and determines availability of a network access token for the web flow. In response to determining that a network access token is available, the network token system 102 issues the network access token to the client device 108a. Consequently, the network token system 102 presents webpage interface 506 for a webpage within the web flow.

Indeed, as illustrated in FIG. 5B, the client device 108a displays a webpage interface 506 for a webpage within the web flow. Specifically, the network token system 102 provides the webpage for display within the webpage interface 506 based on issuing a network access token to the client device 108a. As shown, the webpage interface 506 includes a payment information section 508 whereby a user can enter payment information for purchasing the video game.

In some embodiments, the web flow includes additional webpages. For example, upon entering payment information within the payment information section 508, the user selects a checkout option. In response to detecting the selection of the checkout option, the client device 108a submits a request to navigate to an additional webpage within the web flow. In turn, the network token system 102 receives the request, verifies that the request (or the client device 108a) is associated with a network access token, and provides the additional webpage for display on the client device 108a. Indeed, the network token system 102 facilitates navigation back and forth among different webpages of a web flow by verifying the network access token until the client device 108a exits the web flow by selecting a link to navigate outside of the web flow or as a result of the network access token expiring.

In one or more embodiments, the network token system 102 accesses a third-party server as part of the client device 108a proceeding through the web flow associated with the webpage interface 506. For instance, the network token system 102 verifies payment information such as a credit card number by accessing an external payment system server that validates a credit card number (and/or other payment information) as valid. To access the external server without causing undue delay or overburdening a web flow server, the network token system 102 uses the network access token. For example, the network token system 102 utilizes the network access token associated with the client device 108a to authorize the external server to access the web flow and provide verification of payment information. As another example, the network token system 102 determines availability of additional network access tokens and issues an additional network access token to the external server to grant access to the web flow (e.g., for verifying payment information) according to the availability.

Figure 6B:
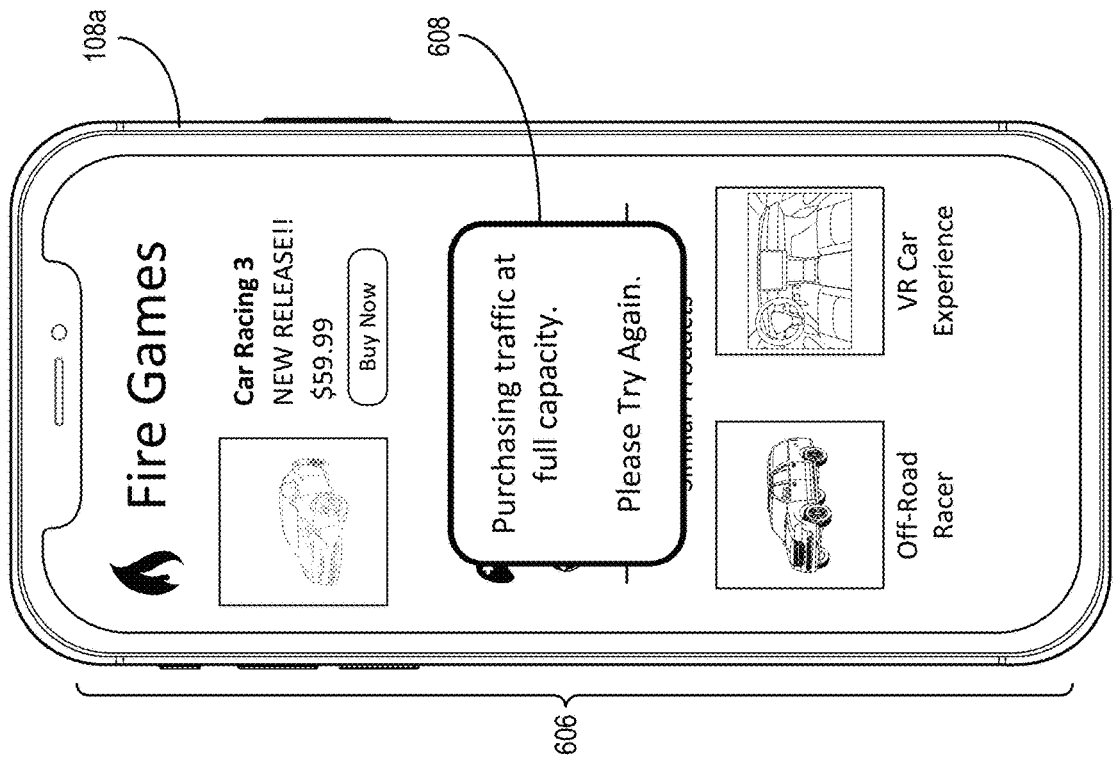
FIGS. 6A-6B illustrate an example sequence of webpage interfaces for preventing access to a web flow utilizing network access tokens in accordance with one or more embodiments.
Figure 6A:
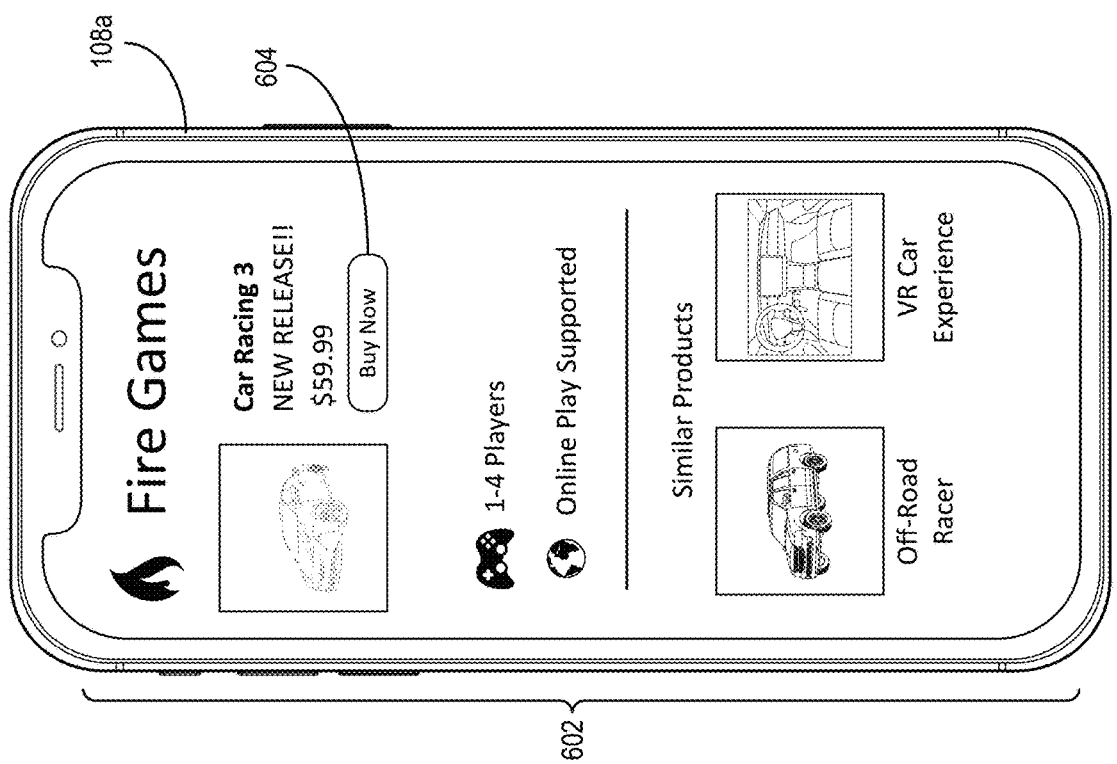

As mentioned above, in certain described embodiments, the network token system 102 prevents client devices from accessing a web flow. In particular, the network token system 102 prevents client devices from accessing a web flow based on determining that no network access tokens for the web flow are available (or that the network capacity associated with the web flow is full). FIGS. 6A-6B illustrate an example flow of graphical user interfaces associated with preventing a client device from accessing a web flow in accordance with one or more embodiments. In some embodiments, the web flow associated with FIGS. 6A-6B can be the same web flow described in relation to FIGS. 5A-5B.

As illustrated in FIG. 6A, the client device 108a presents a webpage interface 602 (e.g., the same as the webpage interface 502). For example, the webpage interface 602 includes information for the "Car Racing 3" video game, along with a purchase option 604. Similar to the above discussion relating to FIG. 5A, the purchase option 604 can represent an entry point for a web flow. Specifically, in response to detecting user interaction selecting the purchase option 604, the client device 108a submits a request to access a web flow.

In response to receiving the request, the network token system 102 determines an availability of network access tokens for the web flow. Indeed, the network token system 102 determines an availability based on a network capacity associated with one or more servers hosting the requested web flow. Upon determining that the web flow is full, or that no network access tokens remain (e.g., the server is at capacity), the network token system 102 prevents the client device 108a from accessing the web flow.

As illustrated in FIG. 6B, the network token system 102 generates and/or provides an error notification 608 for display on the client device 108a. The error notification 608 indicates that network traffic within the web flow is at capacity and that the client device 108a has been denied access. As shown, the client device 108a presents the error notification 608 within the webpage interface 606 (e.g., the same as the webpage interface 602). In certain embodiments, the network token system 102 generates an error notification that includes more information, such as a predicted wait time before a network access token will become available (as predicted by the network token system 102), a number of client devices within the web flow, and/or a place in line associated with the client device 108a for accessing the web flow (e.g., "you are fifth in line"). Indeed, in some implementations, the network token system 102 determines a place in line for each denied client device based on a time of a request and/or other factors such as paid account status, premier status, predicted conversion or web flow completion, or the information relating to historical user interactions (as discussed above). In some cases, however, the network token system 102 generates an error notification in the form of an HTTP status 429 message.

In some embodiments, despite providing the error notification 608 and preventing access to the web flow, the network token system 102 nevertheless permits the network token system 102 to continue browsing the webpage interface 602 (and/or other webpages outside of the web flow). In certain cases, the network token system 102 customizes the webpage interface 602 in response to determining that there are no available network access tokens. For instance, the network token system 102 grays out or removes the purchase option 604 to prevent requests to enter the web flow until at least one network access token becomes available. In some cases, the network token system 102 customizes the webpage interface 602 preemptively before receiving a request from the client device 108a (and determining that not network access tokens remain). In other cases, the network token system 102 customizes the webpage interface 602 in response to receiving a request and after providing the error notification 608.

In one or more embodiments, the network token system 102 receives multiple requests to access a web flow. In particular, the network token system 102 receives a number of requests that exceeds a network capacity associated with the web flow (e.g., exceeds a number of network access tokens). In response, the network token system 102 selects a set of client devices as recipients for a threshold number of network access tokens to permit access to the web flow (e.g., as illustrated in FIGS. 5A-5B). In addition, the network token system 102 prevents additional client devices outside of the set (e.g., beyond the threshold number of available network access tokens) from accessing the web flow (e.g., as illustrated in FIGS. 6A-6B). In some cases, the network token system 102 adds additional client devices to the web flow as permitted client devices within the set exit the web flow.

Figure 7:
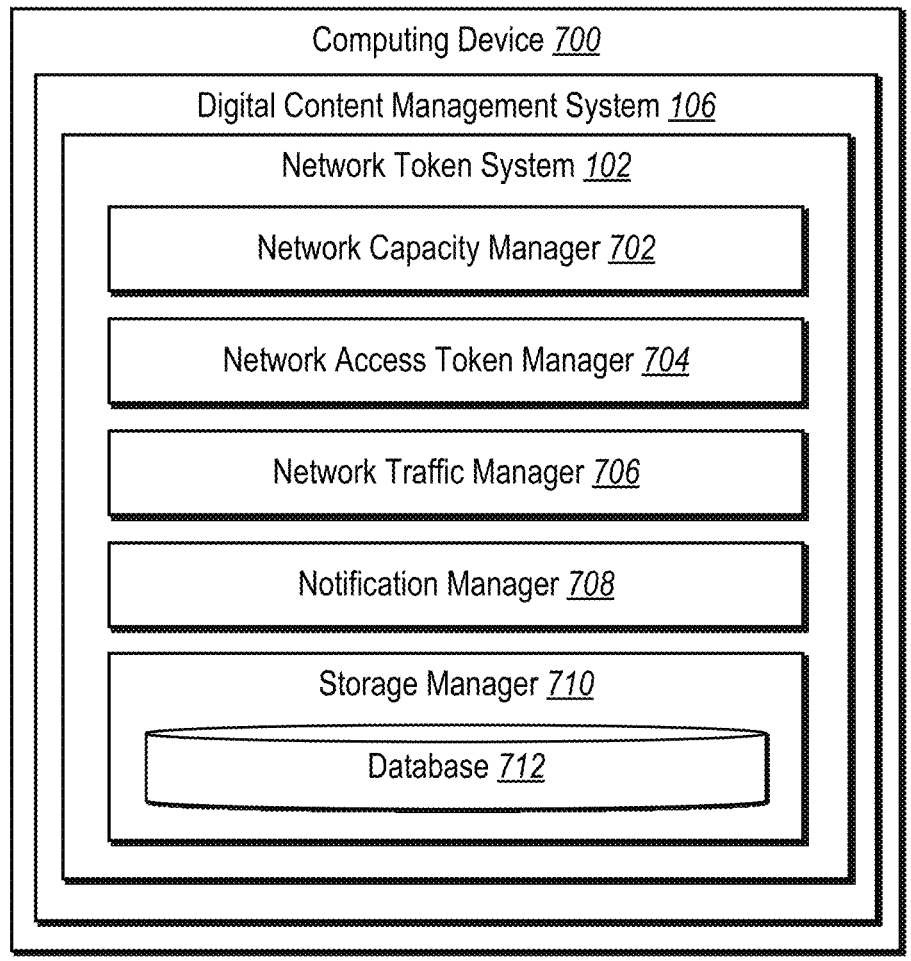
FIG. 7 illustrates a schematic diagram of a network token system in accordance with one or more embodiments.

Looking now to FIG. 7, additional detail will be provided regarding components and capabilities of the network token system 102. Specifically, FIG. 7 illustrates an example schematic diagram of the network token system 102 on an example computing device 700 (e.g., one or more of the client devices 108a-108n and/or the server(s) 104). As shown in FIG. 7, the network token system 102 includes a network capacity manager 702, a network access token manager 704, a network traffic manager 706, a notification manager 708, and a storage manager 710.

As just mentioned, the network token system 102 includes a network capacity manager 702. In particular, the network capacity manager 702 manages, maintains, determines, analyzes, tests, and/or identifies network capacity associated with one or more servers hosting a web flow. For example, the network capacity manager 702 determines a network capacity by determining a number of client devices and/or other network nodes that a web flow server can support (e.g., simultaneously). In some cases, the network capacity manager 702 determines a network capacity by determining a number of (simultaneous) requests that a server can handle from different client devices and/or other network nodes.

As illustrated in FIG. 7, the network token system 102 includes a network access token manager 704. In particular, the network access token manager 704 manages, maintains, generates, assigns, provides, distributes, validates, verifies, invalidates, deletes, removes, reassigns, withholds, and/or identifies network access tokens. For example, the network access token manager 704 generates or determines a number of network access tokens according to a network capacity of a web flow server. In addition, the network access token manager 704 determines an availability of a network access token (e.g., in response to or before a request to access a web flow). The network access token manager 704 further issues a network access token to a client device or withholds a network access token from a client device based on availability. Additionally, the network access token manager 704 releases or invalidates a network access token upon detecting an exit of a corresponding client device from a web flow.

As further illustrated in FIG. 7, the network token system 102 includes a network traffic manager 706. In particular, the network traffic manager 706 manages, maintains, facilitates, enables, and/or processes network traffic associated with a web flow. For example, the network traffic manager 706 permits a client device to access a web flow based on validating a network access token for the client device (e.g., within a request from the client device). In addition, the network traffic manager 706 enables navigation within the web flow by verifying the network access token for additional requests to access various webpages within the web flow. Further, the network traffic manager 706 prevents other client devices from accessing the web flow based on determining that the client devices (or the requests) are not associated with a network access token (and/or that no available network access tokens remain). The network traffic manager 706 further permits additional client devices to access the web flow based on determining that the client devices (or the requests) have been issued network access tokens in response to exits from previously permitted client devices.

Additionally, the network token system 102 includes a notification manager 708. In particular, the notification manager 708 manages, maintains, generates, provides, and/or distributes notifications to client devices. For example, the notification manager 708 generates and provides an error notification for display on a client device in response to determining that the client device has been prevented from accessing a web flow.

The network token system 102 further includes a storage manager 710. The storage manager 710 operates in conjunction with or include one or more memory devices such as the database 712 (e.g., the database 112) that store various data such as network access tokens, web flow information (e.g., webpage data), network capacity information, historical client device interactions, or other information. The storage manager 710 (e.g., via a non-transitory computer memory/one or more memory devices) stores and maintains data associated with determining availability of, and issuing, network access tokens.

In one or more embodiments, each of the components of the network token system 102 are in communication with one another using any suitable communication technologies. Additionally, the components of the network token system 102 is in communication with one or more other devices including one or more client devices described above. It will be recognized that although the components of the network token system 102 are shown to be separate in FIG. 7, any of the subcomponents may be combined into fewer components, such as into a single component, or divided into more components as may serve a particular implementation. Furthermore, although the components of FIG. 7 are described in connection with the network token system 102, at least some of the components for performing operations in conjunction with the network token system 102 described herein may be implemented on other devices within the environment.

The components of the network token system 102 can include software, hardware, or both. For example, the components of the network token system 102 can include one or more instructions stored on a computer-readable storage medium and executable by processors of one or more computing devices (e.g., the computing device 700). When executed by the one or more processors, the computer-executable instructions of the network token system 102 can cause the computing device 700 to perform the methods described herein. Alternatively, the components of the network token system 102 can comprise hardware, such as a special purpose processing device to perform a certain function or group of functions. Additionally, or alternatively, the components of the network token system 102 can include a combination of computer-executable instructions and hardware.

Furthermore, the components of the network token system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the network token system 102 may be implemented as part of a stand-alone application on a personal computing device or a mobile device. Alternatively, or additionally, the components of the network token system 102 may be implemented in any application that allows creation and delivery of marketing content to users, including, but not limited to, applications in ADOBE® ADVERTISING CLOUD, ADOBE® MARKETING CLOUD, and CREATIVE CLOUD®, such as ADOBE® SIGN, ADOBE® STOCK, and BEHANCE®. "ADOBE," "ADOBE ADVERTISING CLOUD," "ADOBE MARKETING CLOUD," "ADOBE SIGN," "ADOBE STOCK," and "BEHANCE," are either registered trademarks or trademarks of Adobe Inc. in the United States and/or other countries.

FIGS. 1-7 the corresponding text, and the examples provide a number of different systems, methods, and non-transitory computer readable media for managing web flow network traffic utilizing network access tokens. In addition to the foregoing, embodiments can also be described in terms of flowcharts comprising acts for accomplishing a particular result. For example, FIG. 8 illustrates flowcharts of example sequences or series of acts in accordance with one or more embodiments.

Figure 8:
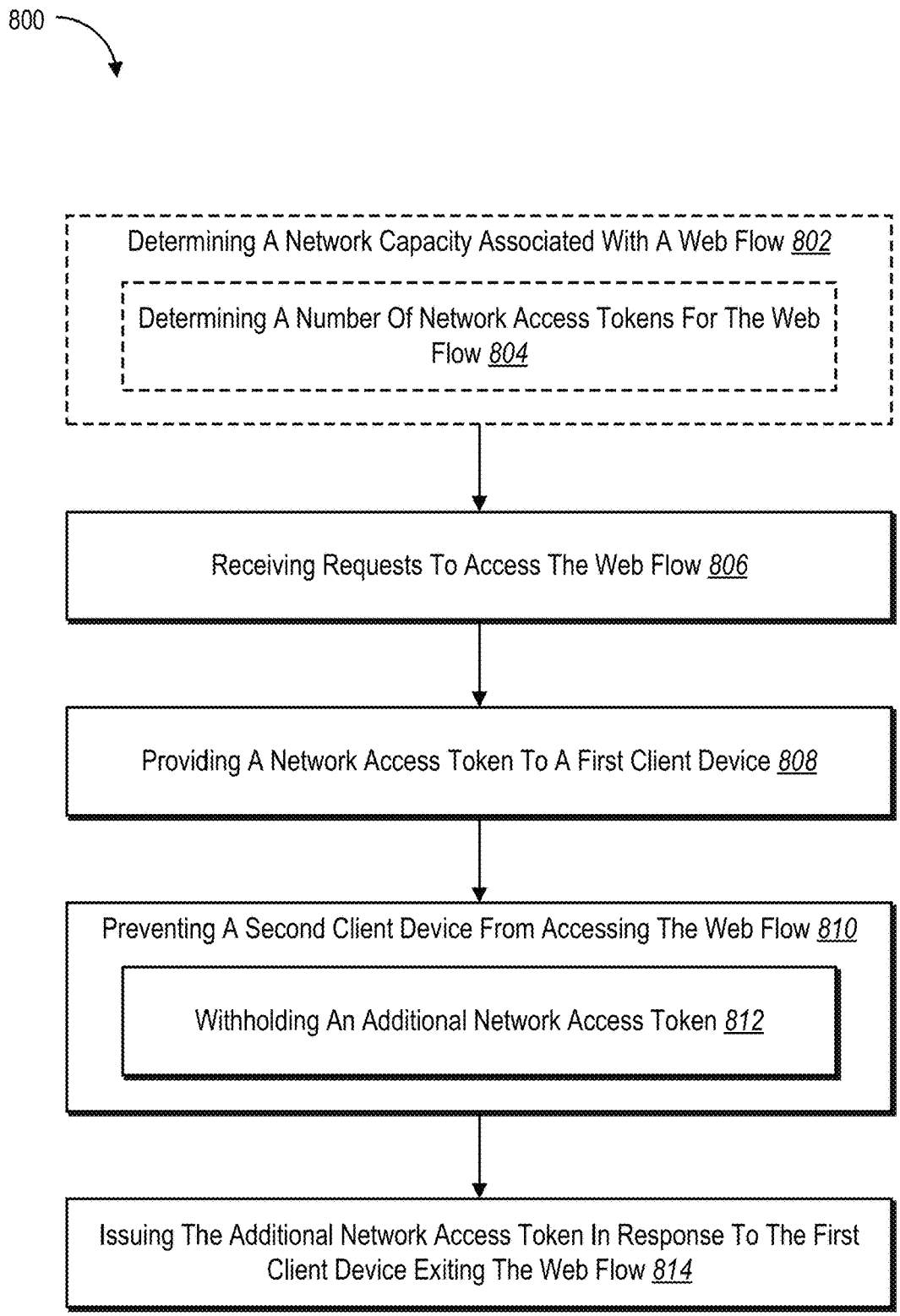
FIG. 8 illustrates a flowchart of a series of acts for managing network traffic for a web flow utilizing network access tokens in accordance with one or more embodiments.

While FIG. 8 illustrates acts according to various embodiments, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8. Additionally, the acts described herein may be repeated or performed in parallel with one another or in parallel with different instances of the same or other similar acts.

FIG. 8 illustrates an example series of acts 800 of managing web flow network traffic utilizing network access tokens. In particular, the series of acts 800 includes an act 802 of determining a network capacity associated with a web flow. For example, the act 802 involves determining a network capacity indicating a number of client devices that can access the web flow. In some embodiments, the act 802 includes determining a threshold number of client devices that the one or more servers can support. In some cases, the act 802 includes an act 804 of determining a number of network access tokens for the web flow. For example, the act 804 involves determining, in response to receiving the requests to access the web flow, a number of available network access tokens for accessing the web flow. In some embodiments, the act 804 involves determining, from the limited network capacity of the one or more servers, a number of network access tokens to make available for permitting client devices to access the web flow.

As shown, the series of acts 800 includes an act 806 of receiving requests to access the web flow. In particular, the act 806 involves receiving requests from client devices to access a web flow hosted by one or more servers with limited network capacity. For example, the act 806 involves receiving a request from a particular client device to access a webpage within the web flow.

Additionally, the series of acts 800 includes an act 808 of providing a network access token to a first client device. In particular, the act 808 involves providing, according to the limited network capacity of the one or more servers, a network access token to a first client device of the client devices to permit the first client device to access the web flow. In some cases, the act 808 involves, in response to receiving the requests to access the web flow, providing network access tokens to a threshold number of client devices corresponding to the network capacity to permit the threshold number of client devices to access the web flow. For instance, the act 808 involves providing, according to the number of available network access tokens, network access tokens to a subset of the client devices to permit the subset of the client devices to access the web flow.

As further illustrated in FIG. 8, the series of acts 800 includes an act 810 of preventing a second client device from accessing the web flow. In particular, the act 810 involves preventing, according to the limited network capacity of the one or more servers, a second client device of the client devices from accessing the web flow. For example, the act 810 involves preventing additional client devices beyond the threshold number from accessing the web flow. In some embodiments, the act 810 involves providing a notification to the second client device that the web flow is unavailable and withholding the additional network access token from the second client device until the first client device exits the web flow. In some cases, the act 810 includes an act 812 of withholding an additional network access token. For example, the act 810 involves preventing the additional client devices beyond the threshold number from accessing the web flow until at least one client device among the threshold number of client devices exits the web flow.

Further, the series of acts 800 includes an act 814 of issuing the additional network access token in response to the first client device exiting the web flow. In particular, the act 814 includes, in response to determining that the first client device exits the web flow, issuing an additional network access token to permit the second client device to access the web flow. For example, the act 814 involves, in response to determining that a client device of the subset of the client devices exits the web flow, issuing an additional network access token to permit an additional client device to access the web flow. In some cases, the act 814 involves performing at least one of: receiving an indication that the first client device navigates from a first webpage within the web flow to a second webpage outside of the web flow or determining that a time threshold corresponding to the network access token has expired. In some cases, the act 814 involves invalidating the network access token associated with a client device that exits the web flow and/or in response to determining that the first client device exits the web flow.

In some embodiments, the series of acts 800 includes an act of prioritizing the first client device, relative to the second client device, in accessing a set of interconnected webpages that make up the web flow by providing the network access token to the first client device. In some cases, the series of acts 800 includes an act of receiving an additional request from a client device among the threshold number of client devices to navigate to a particular webpage of the interconnected webpages within the web flow. In the same or other cases, the series of acts 800 includes an act of, in response to determining that the client device possesses a network access token, permitting the client device to access the particular webpage within the web flow.

In certain embodiments, the series of acts 800 includes an act of selecting one or more client devices to include within the threshold number of client devices based on historical client device interactions associated with the one or more client devices. In one or more embodiments, the series of acts 800 includes an act of receiving, from a client device among the threshold number of client devices with network access tokens, a request to access information hosted by an external server outside of the web flow and an act of, in response to the request to access the webpage hosted by the external server, providing a network access token associated with the client device to the external server to grant access to the information hosted by the external server without leaving the web flow.

In one or more embodiments, the series of acts 800 includes acts of receiving an additional request from the particular client device to access a different webpage within the web flow, in response to receiving the additional request, determining that the particular client device possesses a network access token for the web flow, and, in response to determining that the particular client device possesses the network access token, permitting the particular client device to access the different webpage. In some cases, the series of acts 800 includes acts of determining a number of network nodes required for the one or more servers to host the web flow and determining the number of available network access tokens according to the number of network nodes required to host the web flow and the limited network capacity of the one or more servers.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
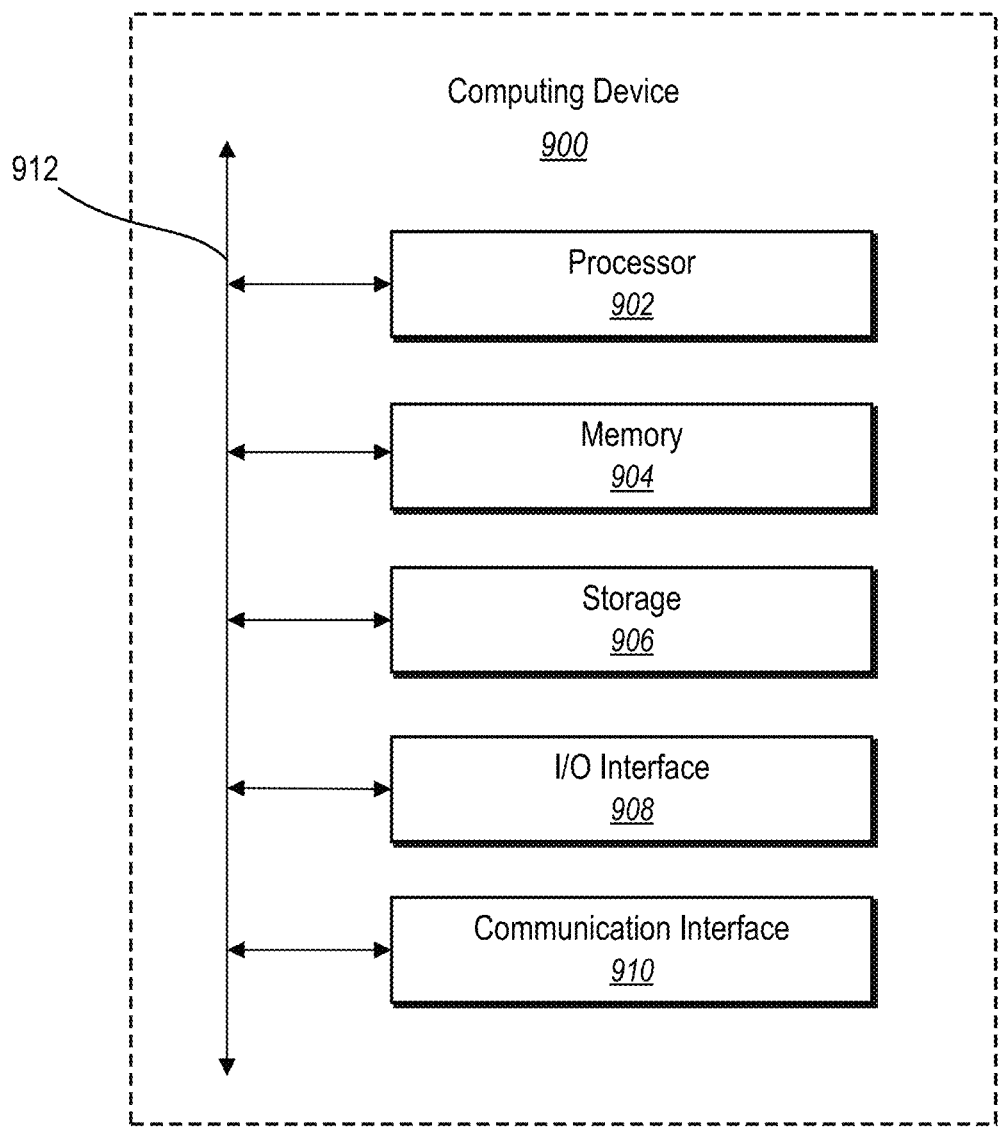
FIG. 9 illustrates a block diagram of an example computing device in accordance with one or more embodiments.

FIG. 9 illustrates, in block diagram form, an example computing device 900 (e.g., the computing device 700, the client devices 108a-108n, and/or the server(s) 104) that may be configured to perform one or more of the processes described above. One will appreciate that the network token system 102 can comprise implementations of the computing device 900. As shown by FIG. 9, the computing device can comprise a processor 902, memory 904, a storage device 906, an I/O interface 908, and a communication interface 910. Furthermore, the computing device 900 can include an input device such as a touchscreen, mouse, keyboard, etc. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, storage device 906 can comprise a non-transitory storage medium described above. The storage device 906 may include a hard disk drive (HDD), flash memory, a Universal Serial Bus (USB) drive or a combination of these or other storage devices.

The computing device 900 also includes one or more input or output ("I/O") devices/interfaces 908, which are provided to allow a user to provide input to (such as user strokes), receive output from, and otherwise transfer data to and from the computing device 900. These I/O devices/interfaces 908 may include a mouse, keypad or a keyboard, a touch screen, camera, optical scanner, network interface, modem, other known I/O devices or a combination of such I/O devices/interfaces 908. The touch screen may be activated with a writing device or a finger.

The I/O devices/interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
   determine, for one or more servers hosting a web flow including a set of interconnected webpages, a limited network capacity indicating a threshold number of client devices that the one or more servers support within the web flow;
   receive requests from client devices to access the web flow hosted by the one or more servers;
   provide, according to the limited network capacity of the one or more servers, a network access token to a first client device of the client devices to permit the first client device to access the web flow;
   withhold, according to the limited network capacity of the one or more servers, network access tokens from a second client device of the client devices to prevent the second client device from accessing the web flow;
   in response to determining that the first client device exits the web flow, issue an additional network access token to permit the second client device to access the web flow;
   receive an additional request from the second client device to navigate to a particular webpage among the set of interconnected webpages within the web flow; and
   in response to determining that the second client device possesses the additional network access token, permit the second client device to access the particular webpage within the web flow.

2. The non-transitory computer readable medium of claim 1, further comprising instructions that, when executed by the at least one processor, cause the computing device to maintain the threshold number of client devices within the web flow by preventing additional client devices in excess of the threshold number from accessing the web flow until issuance of additional network access tokens.

3. The non-transitory computer readable medium of claim 1, further comprising instructions that, when executed by the at least one processor, cause the computing device to determine, from the limited network capacity of the one or more servers, a limited number of network access tokens available for permitting client devices to access the web flow, wherein the limited number of network access tokens matches the threshold number of client devices.

4. The non-transitory computer readable medium of claim 1, further comprising instructions that, when executed by the at least one processor, cause the computing device to invalidate the network access token in response to determining that the first client device exits the web flow.

5. The non-transitory computer readable medium of claim 1, further comprising instructions that, when executed by the at least one processor, cause the computing device to determine that the first client device exits the web flow by performing at least one of: receiving an indication that the first client device navigates from a first webpage within the web flow to a second webpage outside of the web flow or determining that a time threshold corresponding to the network access token has expired.

6. The non-transitory computer readable medium of claim 1, further comprising instructions that, when executed by the at least one processor, cause the computing device to prevent the second client device from accessing the web flow by providing a notification to the second client device that the web flow is unavailable and withholding the additional network access token from the second client device until the first client device exits the web flow.

7. The non-transitory computer readable medium of claim 1, further comprising instructions that, when executed by the at least one processor, cause the computing device to prioritize the first client device, relative to the second client device, in accessing set of interconnected webpages that make up the web flow by providing the network access token to the first client device.

8. A system comprising:
   one or more memory devices comprising a web flow including a set of interconnected webpages; and one or more servers hosting the web flow and configured to cause the system to:
> determine, for the one or more servers hosting the web flow including the set of interconnected webpages, a limited network capacity indicating a threshold number of client devices that the one or more servers support within the web flow;
> receive requests from client devices to access the web flow hosted by the one or more servers;
> in response to receiving the requests to access the web flow, provide network access tokens to the threshold number of client devices corresponding to the limited network capacity to permit the threshold number of client devices to access the web flow;
> prevent additional client devices beyond the threshold number from accessing the web flow;
> receive an additional request from an additional client device among the threshold number of client devices to navigate to a particular webpage among the set of interconnected webpages within the web flow; and
> in response to determining that the additional client device possesses a network access token, permit the additional client device to access the particular webpage within the web flow.

9. The system of claim 8, wherein the one or more servers are further configured to cause the system to prevent the additional client devices beyond the threshold number from accessing the web flow until at least one client device among the threshold number of client devices exits the web flow.

10. The system of claim 8, wherein the one or more servers are further configured to cause the system to prevent the additional client device from accessing the web flow by providing a notification to the additional client device that the web flow is unavailable and by withholding the network access token from the additional client device until a first client device exits the web flow.

11. The system of claim 8, wherein the one or more servers are further configured to cause the system to determine that a client device exits the web flow by receiving an indication that the client device navigates from a first webpage within the web flow to a second webpage outside of the web flow.

12. The system of claim 8, wherein the one or more servers are further configured to cause the system to select one or more client devices to include within the threshold number of client devices based on historical client device interactions associated with the one or more client devices.

13. The system of claim 8, wherein the one or more servers are further configured to cause the system to:
> receive, from a client device among the threshold number of client devices with network access tokens, a request to access information hosted by an external server outside of the web flow; and in response to the request to access the web flow hosted by the external server, provide a network access token associated with the client device to the external server to grant access to the information hosted by the external server without leaving the web flow.

14. The system of claim 8, wherein the one or more servers are further configured to cause the system to invalidate a network access token associated with a client device that exits the web flow.

15. A computer-implemented method comprising:
> determining, for one or more servers hosting a web flow including a set of interconnected webpages, a limited network capacity indicating a threshold number of client devices that the one or more servers support within the web flow;
> receiving requests from client devices to access the web flow hosted by the one or more servers;
> determining, in response to receiving the requests to access the web flow, a number of available network access tokens for accessing the web flow according to the limited network capacity;
> providing, according to the number of available network access tokens, network access tokens to a subset of the client devices to permit the subset of the client devices to access the web flow;
> in response to determining that a client device of the subset of the client devices exits the web flow, issuing an additional network access token to permit an additional client device to access the web flow;
> receiving an additional request from the additional client device to navigate to a particular webpage among the set of interconnected webpages within the web flow; and
> in response to determining that the additional client device possesses the additional network access token, permitting the additional client device to access the particular webpage within the web flow.

16. The computer-implemented method of claim 15, wherein receiving the requests from the client devices to access the web flow comprises receiving a request from a particular client device to access a webpage within the web flow.

17. The computer-implemented method of claim 16, further comprising:
> receiving an additional request from the particular client device to access a different webpage within the web flow;
> in response to receiving the additional request, determining that the particular client device possesses a network access token for the web flow; and
> in response to determining that the particular client device possesses the network access token, permitting the particular client device to access the different webpage.

18. The computer-implemented method of claim 15, further comprising invalidating a network access token associated with the client device in response to determining that the client device exits the web flow.

19. The computer-implemented method of claim 15, wherein determining that the client device exits the web flow comprises determining that a time threshold corresponding to a network access token associated with the client device has expired.

20. The computer-implemented method of claim 15, further comprising:
> determining a number of network nodes required for the one or more servers to host the web flow; and
> determining the number of available network access tokens according to the number of network nodes required to host the web flow and the limited network capacity of the one or more servers.

* * * * *